(12) United States Patent
Broekhuis et al.

(10) Patent No.: US 12,492,175 B2
(45) Date of Patent: Dec. 9, 2025

(54) PROCESS FOR PRODUCING ETHYLENE OXIDE FROM ETHANE BY OXIDATIVE DEHYDROGENATION AND EPOXIDATION USING A RECYCLE REACTOR DESIGN

(71) Applicants: Robert Roger Broekhuis, Sugar Land, TX (US); Pankaj Singh Gautam, Sugar Land, TX (US); Tian Gu, Sugar Land, TX (US); Vidya Sagar Reddy Sarsani, Sugar Land, TX (US); SABIC Global Technologies, B.V., Bergen Op Zoom (NL)

(72) Inventors: Robert Roger Broekhuis, Sugar Land, TX (US); Pankaj Singh Gautam, Sugar Land, TX (US); Tian Gu, Sugar Land, TX (US); Vidya Sagar Reddy Sarsani, Sugar Land, TX (US)

(73) Assignee: SABIC Global Technologies, B.V., Bergen Op Zoom (NL)

( * ) Notice: Subject to any disclaimer, the term of this patent is extended or adjusted under 35 U.S.C. 154(b) by 655 days.

(21) Appl. No.: 17/908,486

(22) PCT Filed: Mar. 5, 2021

(86) PCT No.: PCT/US2021/021178
§ 371 (c)(1),
(2) Date: Aug. 31, 2022

(87) PCT Pub. No.: WO2021/183392
PCT Pub. Date: Sep. 16, 2021

(65) Prior Publication Data
US 2023/0097182 A1 Mar. 30, 2023

Related U.S. Application Data

(60) Provisional application No. 62/987,184, filed on Mar. 9, 2020.

(51) Int. Cl.
*C07D 301/08* (2006.01)

(52) U.S. Cl.
CPC .................. *C07D 301/08* (2013.01)

(58) Field of Classification Search
CPC ..................... C07D 301/08; C07D 303/04
(Continued)

(56) References Cited

U.S. PATENT DOCUMENTS

| 4,658,074 A | 4/1987 | Bajars et al. |
| 4,827,066 A | 5/1989 | Herber et al. |

(Continued)

FOREIGN PATENT DOCUMENTS

| CN | 103328457 A | 9/2013 |
| CN | 103965002 A | 8/2014 |

(Continued)

OTHER PUBLICATIONS

Gaffney et. al. "Ethylene production via oxidative dehydrogenation of ethane using M1 catalyst", Catalysis Today, vol. 285, May 1, 2017, pp. 159-165, 7 Pages.

(Continued)

*Primary Examiner* — Taylor V Oh
(74) *Attorney, Agent, or Firm* — Conley Rose, P.C.; Rodney B. Carroll

(57) ABSTRACT

An ethylene oxide (EO) production process comprising (a) introducing a first reactant mixture ($C_2H_6$, $C_2H_4$, $O_2$) to a first reactor system to produce a first effluent stream ($C_2H_4$, $C_2H_6$, $O_2$), wherein the mole fraction of ethylene in first effluent stream is greater than in first reactant mixture; wherein the first reactor system is characterized by a first reactor system operating temperature of 270° C.-320° C.; wherein the first reactor system comprises oxidative dehydrogenation (ODH) stage(s); (b) introducing the first effluent stream to a second reactor to produce a second effluent (Continued)

stream (EO, $C_2H_4$, $C_2H_6$, $O_2$); (c) separating the second effluent stream into an EO product stream (EO) and recycle stream ($C_2H_4$, $C_2H_6$, $O_2$); wherein ethylene is not separated from recycle stream and/or first effluent stream; (d) recycling at least a portion of recycle stream to the first reactor system, and a optionally portion of recycle stream to the second reactor.

20 Claims, 3 Drawing Sheets

(58) Field of Classification Search
USPC .......................................................... 549/523
See application file for complete search history.

(56) References Cited

U.S. PATENT DOCUMENTS

| | | | |
|---|---|---|---|
| 5,817,841 | A | 10/1998 | Baker et al. |
| 5,929,258 | A | 7/1999 | Hayashi et al. |
| 6,777,371 | B2 | 8/2004 | Liu |
| 7,173,143 | B2 | 2/2007 | Bender et al. |
| 8,105,971 | B2 | 1/2012 | Gaffney et al. |
| 8,148,555 | B2 | 4/2012 | Lockemeyer et al. |
| 8,519,210 | B2 | 8/2013 | Arnold et al. |
| 8,846,996 | B2 | 9/2014 | Kustov et al. |
| 8,969,602 | B2 | 3/2015 | Verhaak |
| 9,139,544 | B2 | 9/2015 | Jovanovic et al. |
| 9,545,610 | B2 | 1/2017 | Simanzhenkov et al. |
| 9,649,621 | B2 | 5/2017 | Shibata et al. |
| 2010/0255986 | A1 | 10/2010 | Gaffney et al. |
| 2014/0018557 | A1 | 1/2014 | Verhaak |
| 2015/0251979 | A1 | 9/2015 | Verhaak et al. |
| 2018/0044308 | A1 | 2/2018 | Al-Shammari et al. |
| 2019/0248717 | A1 | 8/2019 | Gaffney et al. |

FOREIGN PATENT DOCUMENTS

| | | |
|---|---|---|
| CN | 108025998 A | 5/2018 |
| CN | 108947938 A | 12/2018 |
| EP | 0261264 A1 | 3/1988 |
| EP | 0893443 A2 | 1/1999 |
| WO | 2000020404 A1 | 4/2000 |
| WO | 2018019760 A1 | 2/2018 |
| WO | 2018085614 A1 | 5/2018 |
| WO | 2019197249 A1 | 10/2019 |

OTHER PUBLICATIONS

Rodríguez et. al. "Reactor Designs for Ethylene Production via Ethane Oxidative Dehydrogenation: Comparison of Performance", Industrial & Engineering Chemistry Research, 2011, vol. 50, Mar. 2, 2011, pp. 2690-2697, 8 Pages.

Mazanec et al., "Production of Ethylene by Oxidative Dehydrogenation in Microchannel Reactors", IChE Ethylene Producers Conference Proceedings, Apr. 26, 2006, vol. 2, pp. 540-541, 2 Pages.

Gamaliel Che-Galicia et. al. "The role of kinetics and heat transfer on the performance of an industrial wall-cooled packed-bed reactor: ODH of ethane", AIChE Journal, Published: Dec. 19, 2019, pp. 1-18, 18 Pages.

Z. Skoufa et al. "Simulation-aided effective design of a catalytic reactor for ethane oxidative dehydrogenation over NiNbOx", Catalysis Today, vol. 299, Jan. 1, 2018, pp. 102-111, 10 Pages.

Hamid Asadi-Saghandi et. al. "Performance evaluation of a novel reactor configuration for oxidative dehydrogenation of ethane to ethylene", Korean Journal of Chemical Engineering, vol. 34, May 31, 2017, pp. 1905-1913, 9 Pages.

Foreign communication from related application—International Search Report and Written Opinion dated Jun. 29, 2021 for application No. PCT/US2021/021178 filed on Mar. 5, 2021, 10 Pages.

Foreign communication from related application—International Preliminary Report on Patentability dated Sep. 6, 2022 for application No. PCT/US2021/021178 filed Mar. 5, 2021, 7 pages.

"Hydrocarbon Processing—Petrochemical Processes", Hydrocarbon Processing, Gulf Publishing Co. Houston, US, ISSN:0018-8190, Mar. 1, 2003, pp. 70-126.

PROCESS FOR PRODUCING ETHYLENE OXIDE FROM ETHANE BY OXIDATIVE DEHYDROGENATION AND EPOXIDATION USING A RECYCLE REACTOR DESIGN

CROSS REFERENCE TO RELATED APPLICATION

This application is a filing under 35 U.S.C. 371 of International Application No. PCT/US2021/021178 filed Mar. 5, 2021, entitled "Process for Producing Ethylene Oxide from Ethane by Oxidative Dehydrogenation and Epoxidation Using a Recycle Reactor Design" which claims priority to U.S. Provisional Application No. 62/987,184 filed Mar. 9, 2020, which applications are incorporated by reference herein in their entirety.

TECHNICAL FIELD

The present disclosure relates to a process for the production of ethylene oxide, more specifically a process for the production of ethylene oxide that integrates oxidative dehydrogenation of ethane with ethylene epoxidation.

BACKGROUND

Ethylene oxide (EO) is an important petrochemical intermediate, and it is a starting material for the production of ethylene glycol, as well as other glycols (e.g., polyethylene glycols), ethoxylates, ethanol-amines, solvents, and glycol ethers. EO is currently produced using a sequence of conventional ethylene production technology (e.g., steam cracking, such as ethane steam cracking) and conventional ethylene oxide production technology (e.g., catalytic epoxidation). Steam cracking is a capital-intensive process with incomplete selectivity to ethylene.

Ethane oxidative dehydrogenation (ODH) technology has been contemplated for the production of ethylene with subsequently using the produced ethylene to yield EO, but such a process has not yet found significant commercial application. Subsequent to the recovery of the EO, the stream containing unconverted ethylene and ethane could be separated into an ethane-rich stream that could be recycled to the ODH reactor and an ethylene-rich stream that can be recycled to the EO reactor, but such separation is very costly, owing in part to the large stream volume that would need to undergo the separation. Further, such a separation would be conventionally carried out by cryogenic distillation; and undertaking a large-scale cryogenic separation of the stream containing unconverted ethylene and ethane obtained after the recovery of EO, given associated refrigeration loads and distillation tower sizes, would be prohibitively expensive. Thus, there is an ongoing need for the development of processes that combine the ODH and EO technologies, while providing for an increased chemical efficiency and/or lower capital cost.

BRIEF DESCRIPTION OF THE DRAWINGS

For a detailed description of the preferred embodiments of the disclosed methods, reference will now be made to the accompanying drawing in which.

DETAILED DESCRIPTION

Figure 1:
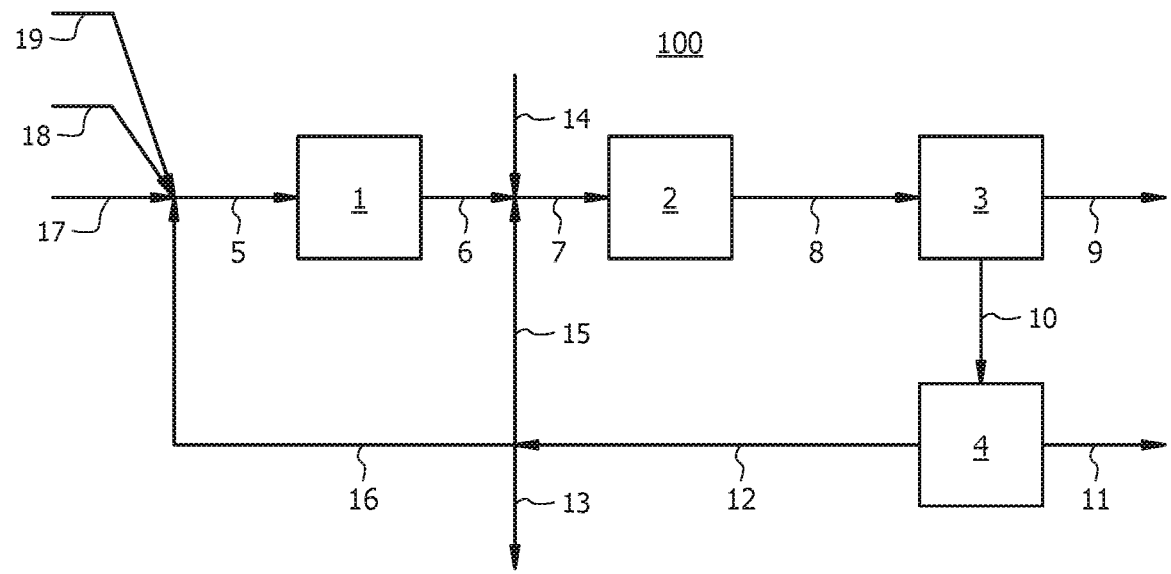
FIG. 1 displays a schematic of a system for an ethylene oxide (EO) production process.

Disclosed herein are processes for producing ethylene oxide (EO) comprising using (i) a first catalytic reactor system (e.g., oxidative dehydrogenation (ODH) reactor system) for converting ethane to ethylene by ODH and (ii) a second catalytic reactor (e.g., EO reactor) for converting ethylene to EO. The processes for producing EO as disclosed herein can advantageously provide for higher overall carbon efficiency and/or lower overall capital intensity than conventional processes for the production of EO, for example a conventional process employing an ethane steam cracker combined with an EO reactor. The processes for producing EO as disclosed herein can advantageously provide for configurations of systems for EO production that enhance capital efficiency and/or carbon efficiency of an integrated process (i.e., a process that integrates ODH and EO technologies) that converts an ethane feedstock to EO, wherein the produced EO can be subsequently converted to ethylene glycol.

Further disclosed herein are ODH reactor system configurations, wherein the heat of reaction (i.e., ODH reaction) can be removed using conventional cooling media such as boiling water or heat transfer oils, in cooled as well as piece-wise adiabatic reactor configurations (e.g., ODH stage configurations). The ODH reactor system configurations as employed in the integrated process for producing EO as disclosed herein, which integrates the ODH reactor system with the EO reactor, can significantly enhance the capital efficiency of the integrated process that converts ethane feedstock to ethylene oxide that can be subsequently converted to ethylene glycol.

The ODH reactor system and the EO reactor as disclosed herein can be advantageously operated in a recycle configuration, wherein substantially all of the effluent from the ODH reactor system can be directed to the EO reactor, and wherein the unreacted part of the effluent from the EO reactor (i.e., after EO recovery) can be recycled partly to the ODH reactor system and partly to the EO reactor. In this recycle process (i.e., the process for producing EO as disclosed herein), there is no need to separate ethylene from ethane in the unreacted part of the effluent from the EO reactor. Further, there is substantially no need to separate unconverted oxygen in the process, since oxygen is conveniently and advantageously recycled back to the ODH reactor system and the EO reactor.

In some aspects, the processes for producing EO as disclosed herein can comprise recycling at least a portion of the recycle flow (i.e., unreacted part of the effluent from the EO reactor) to the ODH reactor system, while another portion or no portion of the recycle flow is returned to the EO reactor. The processes for producing EO as disclosed herein can advantageously introduce oxygen make-up streams to both the ODH reactor system and the EO reactor.

However, the recycle stream may increase the total feed flow to the ODH reactor system, which in turn may increase reactor size, which requires an effective design of the ODH reactor system in order to develop an economically attractive integrated process. Specifically, the ODH reactor system configurations can advantageously avoid the use of less economically attractive heat removal options, such as molten salts or supercritical steam, which have been previously considered for multitubular ODH reactors.

Further disclosed herein is a multitubular ODH reactor system cooled with boiling water or heat transfer oil, wherein the multitubular ODH reactor system can be operated in the temperature range of 270° C.-320° C., at pressures, flowrates, and feed compositions suitable for effecting the desirable level of (partial) conversion of ethane and oxygen as disclosed herein.

Also disclosed herein is a multistage ODH reactor system comprising two or more ODH stages with interstage cooling between consecutive ODH stages, in which each ODH stage can be conducted substantially adiabatically, with interstage feed of ethane and/or oxygen.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Reference throughout the specification to "an aspect," "another aspect," "other aspects," "some aspects," and so forth, means that a particular element (e.g., feature, structure, property, and/or characteristic) described in connection with the aspect is included in at least an aspect described herein, and may or may not be present in other aspects. In addition, it is to be understood that the described element(s) can be combined in any suitable manner in the various aspects.

As used herein, the terms "inhibiting" or "reducing" or "preventing" or "avoiding" or any variation of these terms, include any measurable decrease or complete inhibition to achieve a desired result.

As used herein, the term "effective," means adequate to accomplish a desired, expected, or intended result.

As used herein, the terms "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps.

For purposes of the disclosure herein, the term "reactor system" is understood to encompass one or more reactors; one or more reaction vessels; one or more stages; one or more reaction zones; or combinations thereof.

Unless defined otherwise, technical and scientific terms used herein have the same meaning as is commonly understood by one of skill in the art.

Referring to the configuration of FIG. 1, an ethylene oxide (EO) production system 100 is disclosed. EO production system 100 generally comprises a first reactor system or an oxidative dehydrogenation (ODH) reactor system 1; a second reactor or an EO reactor 2; a product recovery system 3; and a carbon dioxide ($CO_2$) removal system 4.

Figure 2:
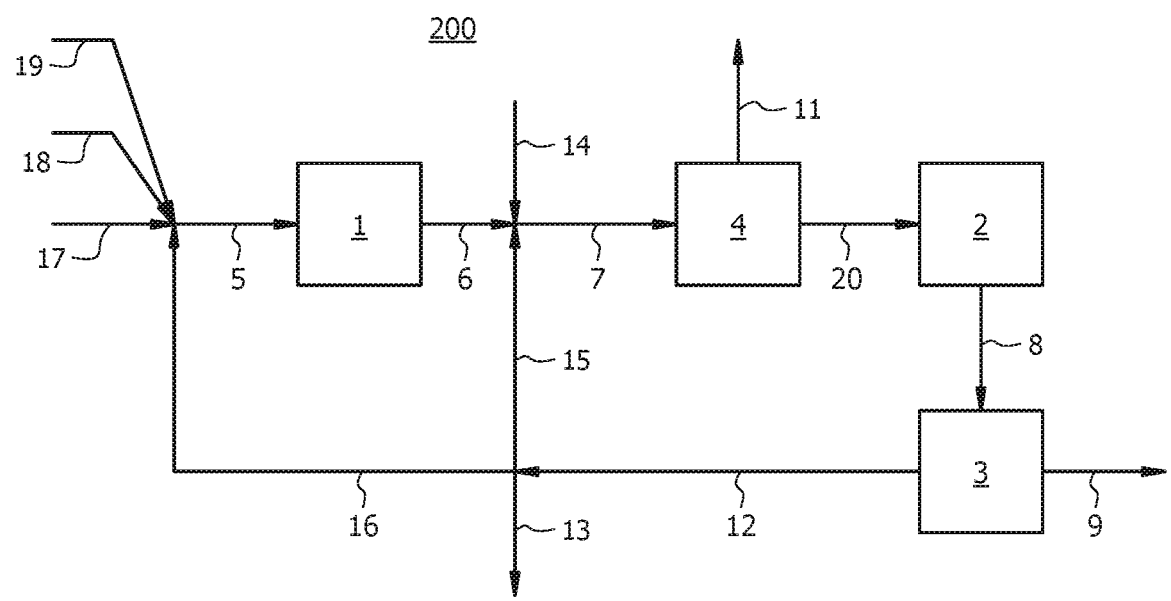
FIG. 2 displays another schematic of a system for an EO production process.

Referring to the configuration of FIG. 2, an ethylene oxide (EO) production system 200 is disclosed. EO production system 200 generally comprises a first reactor system or an ODH reactor system 1; a second reactor or an EO reactor 2; a product recovery system 3; and a $CO_2$ removal system 4. As will be appreciated by one of skill in the art, and with the help of this disclosure, EO production system components shown in FIGS. 1-2 can be in fluid communication with each other (as represented by the connecting lines indicating a direction of fluid flow) through any suitable conduits (e.g., pipes, streams, etc.). Further, and as will be appreciated by one of skill in the art, and with the help of this disclosure, EO production systems 100 and 200 depicted in FIGS. 1-2 may further comprise additional operations and/or equipment, such as compressors, heaters, coolers, water removal systems, etc. Common reference numerals refer to common components present in one or more of the Figures, and the description of a particular component is generally applicable across respective Figures wherein the component is present, except as otherwise indicated herein.

In an aspect, a process for producing EO as disclosed herein can comprise a step of introducing a first reactant mixture (e.g., ODH reactor feed stream 5) to the ODH reactor system 1 to produce a first effluent stream (e.g., ODH reactor effluent stream 6); wherein the first reactant mixture comprises ethane ($C_2H_6$), and oxygen ($O_2$); and wherein the first effluent stream comprises ethylene ($C_2H_4$), ethane, and oxygen. The first reactant mixture further comprises ethylene, wherein the mole fraction of ethylene in the first effluent stream is greater than the mole fraction of ethylene in the first reactant mixture. In some aspects, ethane, ethylene and oxygen may be fed to the ODH reactor system 1 together, for example via ODH reactor feed stream 5, as displayed in the configuration of FIGS. 1 and 2. In other aspects, ethane, ethylene and oxygen may be fed to the ODH reactor system 1 separately, wherein one or more components of the first reactant mixture may be fed to the ODH reactor system 1 separately. For example, a stream comprising ethylene and ethane and a separate stream comprising oxygen may be fed to the ODH reactor system 1 separately (e.g., without contacting each other prior to introducing to the ODH reactor system 1).

In some aspects, for example as displayed in the configuration of FIGS. 1-2, a recycle stream (e.g., ODH recycle feed stream 16) recovered from the EO production process may be combined with one or more streams to produce the ODH reactor feed stream 5. For example, ODH recycle feed stream 16 may be combined with an ethane feed stream 17, an ODH oxygen make-up feed stream 18, and optionally with a ballast gas make-up stream 19 to yield the ODH reactor feed stream 5. ODH recycle feed stream 16 comprises ethylene, ethane, oxygen, and a ballast gas, and it will be described in more detail later herein. Ethane feed stream 17 provides for supplemental ethane or "fresh" ethane, which replenishes the ethane that has been consumed (e.g., via ODH reaction in ODH reactor system 1, undesired side reactions in EO reactor 2) and/or lost (e.g., via purge stream 13) in the process. For purposes of the disclosure herein, the term "fresh" component (e.g., fresh ethane, fresh oxygen, fresh methane, etc.) refers to a component of a reactant mixture (e.g., first reactant mixture, second reactant mixture, etc.) that does not comprise the component recovered from the process and recycled back into the process, but rather refers to a supplemental source of such component which is introduced to the reactant mixture.

In some aspects, the first reactant mixture can be characterized by a molar ratio of ethylene to ethane of equal to or greater than about 1.3, equal to or greater than about 1.5, equal to or greater than about 2.0, equal to or greater than about 2.1, equal to or greater than about 2.2, equal to or greater than about 2.3, equal to or greater than about 2.4, or equal to or greater than about 2.5, from about 1.3 to about 3.0, from about 1.5 to about 2.7, or from about 2.0 to about 2.6. In other aspects, the first reactant mixture can be characterized by a molar ratio of ethylene to ethane of less than about 1.3, less than about 1.0, or less than about 0.5, from about 0.1 to less than about 1.3, from about 0.2 to about 1.0, or from about 0.3 to about 0.8.

In an aspect, the ODH oxygen make-up feed stream 18 can be provided to the ODH reactor system 1. Stream 18 can be oxygen gas, technical oxygen (which can contain some air), air, oxygen enriched air, and the like, or combinations thereof. In an aspect, stream 18 comprises substantially pure oxygen (e.g., oxygen having less than about 1 vol. % contaminants, such as nitrogen ($N_2$), argon (Ar), etc.). The ODH oxygen make-up feed stream 18 provides for supplemental oxygen or fresh oxygen, which replenishes the oxygen that has been consumed (e.g., via ODH reaction in the ODH reactor system 1, EO reaction in EO reactor 2, combustion reactions in ODH reactor system 1 and EO reactor 2, etc.) and/or lost (e.g., via purge stream 13) in the process.

In an aspect, the ballast gas make-up stream 19 can be provided to the ODH reactor system 1. Generally the term "ballast gas" refers to a diluent gas (e.g., gaseous compound or combination of gaseous compounds) that is introduced to a particular reactor system, reactor, stage, reaction zone, etc., wherein the diluent gas does not significantly participate in chemical reactions in that particular reactor system, reactor, stage, reaction zone, etc., respectively. Ballast gases can be used for the purposes of diluting reacting components in a reactor feed; providing better chemical and/or thermal control of a reactor system, reactor, stage, reaction zone, etc.; etc.

Nonlimiting examples of ballast gases suitable for use in the present disclosure include methane ($CH_4$), $N_2$, steam, noble gases, such as Ar, and the like, or combinations thereof. In an aspect, the ballast gas make-up stream 19 comprises methane.

In an aspect, the ODH reactor system 1 can be characterized by an ODH reactor system operating pressure of from about 1 barg to about 35 barg, from about 3 barg to about 30 barg, from about 5 barg to about 25 barg, or from about 10 barg to about 20 barg. The ODH reactor system operating pressure can be substantially the same as an EO reactor operating pressure. In some aspects, the ODH reactor system operating pressure can be from about 1 barg to about 10 barg greater than the EO reactor operating pressure, thereby avoiding the need for excessive compression.

In an aspect, an ODH reactor system 1 as disclosed herein can comprise one or more ODH stages. In some aspects, the ODH reactor system 1 can comprise a single ODH stage. In other aspects, the ODH reactor system 1 can comprise two or more ODH stages. In an aspect, an ODH stage may comprise one or more ODH reaction zones.

In an aspect, the ODH reactor system 1 as disclosed herein can comprise multiple ODH stages, wherein each individual ODH stage can comprise one or more ODH reaction zones, and wherein each individual ODH stage can be repeated as necessary to achieve a target ethane and/or oxygen conversion for the overall multiple ODH stages. For purposes of the disclosure herein, an ODH stage can be defined as a single pass conversion through (i) an ODH reaction zone or (ii) a plurality of ODH reaction zones arranged substantially in parallel. Any suitable physical configuration and arrangement of components of an ODH catalyst bed (e.g., catalyst particles, inert media, spacers, support structures, screens, multitubular configuration with catalyst tubes in parallel, etc.) within an ODH stage may be employed. For example, an ODH stage may comprise one or more ODH catalyst beds in parallel (e.g., one or more ODH reaction zones in parallel pertaining to the same ODH stage). However, it should be understood that any suitable stage/reactor/catalyst bed configurations can be used. For example, two or more ODH stages can be housed in one or more ODH reactors. It should be understood that any suitable number of ODH stages can be used, such as for example, 2 stages, 3 stages, 4 stages, 5 stages, 6 stages, 7 stages, 8 stages, 9 stages, 10 stages, or more stages.

In some aspects, the ODH reactor system 1 can comprise a single ODH stage having two or more ODH reaction zones in parallel, such as in the case of a multitubular ODH reactor system, wherein the tubes of the multitubular ODH reactor system are the ODH reaction zones. As will be appreciated by one of skill in the art, and with the help of this disclosure, a multitubular ODH reactor system may consist of a single ODH stage having two or more ODH reaction zones in parallel.

In other aspects, the ODH reactor system 1 can comprise two or more ODH stages in series. For example, multiple ODH stages can be housed within a single ODH reaction vessel, e.g., an ODH vessel comprising two or more ODH catalyst beds in series, with interstage cooling (e.g., cooling between the catalyst beds in series). As another example, multiple ODH stages may be implemented via a corresponding plurality of ODH reactors (e.g., adiabatic ODH reactors) in series with interstage cooling, which will be described in more detail later herein.

The ethane introduced to the ODH reactor system 1 contacts an ODH catalyst and, in the presence of oxygen, is converted to ethylene via the exothermic ODH reaction (1):

$$C_2H_6 + \tfrac{1}{2}O_2 \rightarrow C_2H_4 + H_2O \quad (1)$$

Several side reactions or unwanted reactions (i.e., reactions other than ethane conversion to ethylene via the ODH reaction) can take place in the ODH reactor system 1, as follows. A portion of the ethylene, as well as a portion of the ethane in the ODH reactor system 1 can be converted to oxygenated organic compounds, such as aldehydes and/or carboxylic acids; acetylene; carbon dioxide ($CO_2$); optionally carbon monoxide (CO); water; and the like; or combinations thereof.

In an aspect, the ODH reactor system 1 comprises an ODH catalyst. The ODH catalyst comprises any ODH catalyst suitable for catalyzing an ODH reaction. For example, the ODH catalyst can comprise a mixed metal oxide, such as a mixed metal oxide comprising molybdenum, vanadium, niobium, tellurium, and the like, or combinations thereof. The ODH catalyst is described in more detail in U.S. Pat. Nos. 8,105,971; 8,519,210; 8,846,996; and 9,545,610; each of which is incorporated by reference herein in its entirety.

In an aspect, the ODH reactor system 1 can be characterized by an ODH reactor system operating temperature (e.g., first reactor system operating temperature) of from about 270° C. to less than about 320° C., from about 270° C. to less than about 310° C., or from about 270° C. to less than about 300° C. The ODH reactor system operating temperature is defined as the average of ODH reactor system inlet temperature and ODH reactor system outlet temperature. For purposes of the disclosure herein, the term "inlet temperature" (e.g., ODH reactor system inlet temperature; ODH stage inlet temperature) refers to the temperature of the feed gas (e.g., first reactant mixture; ODH reactor feed stream 5; feed to an ODH stage) at the point it first comes into contact with the catalyst (e.g., ODH catalyst), which inlet temperature may be higher than the temperature of fresh feed introduced into the reactor vessel or stage, for example because the feed has been preheated within the reactor vessel or ODH stage, respectively. As will be appreciated by one of skill in the art, and with the help of this disclosure, for the first (e.g., initial) ODH stage, the ODH reactor system inlet temperature and the ODH stage inlet temperature are the same. Further, for purposes of the disclosure herein, the term "outlet temperature" (e.g., ODH reactor system outlet temperature; ODH stage outlet temperature) refers to the temperature of the effluent at the outlet out of the ODH reactor system 1 or any stage thereof. For example, the term "ODH reactor system outlet temperature" refers to the temperature of the effluent at the outlet of the overall ODH reactor system 1, where the first effluent stream is recovered. As another example, the term "ODH stage outlet temperature" refers to the temperature of the effluent at the outlet of the ODH stage, where the effluent from the first ODH stage is recovered. As will be appreciated by one of skill in the art, and with the help of this disclosure, for the last (e.g., final) ODH stage, the ODH reactor system outlet temperature and the ODH stage outlet temperature are the same.

In an aspect, each ODH stage can be individually characterized by an ODH stage operating temperature of from about 270° C. to less than about 320° C., from about 270° C. to less than about 310° C., or from about 270° C. to less than about 300° C. Each ODH stage operating temperature is defined as the average of ODH stage inlet temperature and ODH stage outlet temperature for that particular ODH stage. The ODH stage operating temperature of any two ODH stage can be the same or different. The ODH stage operating temperature of any individual ODH stage and the ODH reactor system operating temperature can be the same or different. In some aspects, the ODH reactor system operating temperature and each ODH stage operating temperature can be substantially the same.

In an aspect, the ODH reactor system operating temperature and each ODH stage operating temperature can be from about 270° C. to less than about 300° C. Temperatures below about 300° C. are especially advantageous because the corresponding steam pressure is suitably below 85 barg.

Without wishing to be limited by theory, and owing to the ODH reaction being exothermic, the ODH reaction causes the temperature in the ODH reactor system 1 and/or any stage thereof to increase. Thus, the ODH reactor system 1 and/or any stage thereof may need to be cooled, for example by using a cooling medium. In an aspect, the cooling medium can provide for maintaining the ODH reactor system operating temperature (e.g., first reactor system operating temperature) within a range of from about 270° C. to less than about 320° C., from about 270° C. to less than about 310° C., or from about 270° C. to less than about 300° C. In an aspect, the cooling medium can provide for maintaining each ODH stage operating temperature within a range of from about 270° C. to less than about 320° C., from about 270° C. to less than about 310° C., or from about 270° C. to less than about 300° C. In an aspect, the cooling medium employed to maintain the operating temperature of the ODH reactor system 1 and/or any stage thereof within a range of from about 270° C. to less than about 320° C. can comprise boiling water, heat transfer oil, and the like, or combinations thereof. As will be appreciated by one of skill in the art, and with the help of this disclosure, owing to the exothermic reaction, intermediate temperatures within an ODH stage may exceed the inlet and/or the outlet temperatures. Such temperature higher than the inlet and/or the outlet temperatures is typically referred to as a "hot spot," and may be acceptable in this disclosure provided that an uncontrolled temperature increase (i.e., thermal runaway) is avoided.

In an aspect, the cooling medium employed to maintain the operating temperature of the ODH reactor system 1 and/or any stage thereof within a range of from about 270° C. to less than about 320° C. can comprise boiling water; wherein the boiling water can be characterized by a temperature of from about 260° C. to about 310° C., from about 265° C. to about 305° C., from about 265° C. to about 295° C., or from about 270° C. to about 300° C.

In an aspect, the ODH reactor system 1 can be a multitubular reactor (e.g., multitubular ODH reactor), and wherein the multitubular reactor comprises a shell and a plurality of tubes disposed inside the shell. The multitubular ODH reactor can have the ODH catalyst disposed either tube-side (e.g., inside the tubes) or shell-side (e.g., outside the tubes). The multitubular ODH reactor can have any suitable number of tubes, such as 2, 3, 4, 5, 6, 7, 8, 9, 10, 20, 25, 50, or more tubes.

In some aspects, the multitubular ODH reactor can have the ODH catalyst disposed tube-side, wherein each tube comprises an ODH catalyst disposed therein; wherein each tube is an ODH reaction zone; wherein the plurality of tubes are substantially parallel to each other; wherein the first reactant mixture is introduced to each of the plurality of tubes (e.g., via tube inlet); and wherein the first effluent stream comprises the combined effluents from each tube. The multitubular ODH reactor can comprise a cooling medium contacting an inside shell surface and an outside surface of the tubes; wherein the cooling medium can comprise water (e.g., boiling water) and/or heat transfer oil; and wherein the cooling medium maintains the ODH reactor system operating temperature within a range of from about 270° C. to about 320° C.

In other aspects, the multitubular ODH reactor can have the ODH catalyst disposed shell-side (e.g., inside the shell and outside of the tubes); wherein each of the plurality of the tubes conveys a cooling medium contacting an inside surface of the tubes; and wherein the first reactant mixture is introduced inside the shell and outside of the tubes via an ODH reactor system inlet; and wherein the first reactor effluent is recovered via an ODH reactor system outlet. The tubes can have any suitable geometry; for example substantially parallel to each other and to the direction of flow in the reactor, substantially parallel to each other and perpendicular to the direction of flow in the reactor, coiled, and the like, or combinations thereof. In such aspects, the cooling medium can comprise water and/or heat transfer oil; wherein the cooling medium maintains the ODH reactor system operating temperature within a range of from about 270° C. to about 320° C.

In an aspect, the multitubular ODH reactor can employ a cooling medium comprising boiling water; wherein the boiling water is characterized by a temperature of from about 260° C. to about 310° C.; and wherein the cooling medium maintains the ODH reactor system operating temperature within a range of from about 270° C. to less than about 320° C. Maintaining the ODH reactor system operating temperature within a range of from about 270° C. to less than about 320° C. can advantageously provide for avoiding runaway temperatures in the ODH catalyst bed within the multitubular ODH reactor.

In an aspect, the ODH reactor system 1 can comprise two or more ODH stages in series; wherein an ODH stage effluent is recovered from each ODH stage; wherein at least one ODH stage is substantially adiabatic; and wherein the ODH stage effluent is cooled prior to introducing it to a downstream ODH stage. An ODH stage effluent recovered from the initial (e.g., first) ODH stage, as well as from any intermediate ODH stages, is generally introduced to the next consecutive (e.g., downstream) ODH stage as a reactant mixture, optionally along with makeup oxygen and/or makeup ethane. The ODH stage effluent recovered from the final (e.g., last) ODH stage is the first effluent stream (e.g., ODH reactor effluent stream 6).

In an aspect, each ODH stage can be operated substantially adiabatically to the extinction of one of the reactants that participate in the ODH reaction, such as ethane or oxygen. In an aspect, each ODH stage can be operated substantially adiabatically to the extinction of ethane. Operating the ODH stage to the extinction of one of the reactants that participate in the ODH reaction allows for limiting conversion in the ODH stage, therefore controlling the temperature increase in the ODH stage (which may be operated substantially adiabatically), and thereby advantageously avoiding runaway temperatures in the ODH catalyst bed within the ODH stage. Operating the ODH stage to the extinction of one of the reactants can further employ interstage feeding of one or more of the reactants that participate in the ODH reaction, e.g., ethane and/or oxygen. Further, operating each ODH stage to the extinction of ethane can advantageously result in a relatively low ethane concentration in the feed to the EO reactor 2 and/or in the recycle stream.

In an aspect, interstage effluent cooling can be employed between any two consecutive ODH stages in series; for example by heat exchanging between an ODH stage effluent and a cooling medium, wherein the cooling medium can comprise water (e.g., boiling water) and/or heat transfer oil. Without wishing to be limited by theory, owing to the exothermic nature of the ODH reaction, the temperature can increase within each adiabatic ODH stage, wherein the ODH stage effluent can be cooled to a temperature suitable for the next consecutive (e.g., downstream) ODH stage (e.g., suitable inlet temperature for the next ODH stage).

In an aspect, an ODH reactor system 1 as disclosed herein can be characterized by an oxygen conversion (e.g., overall oxygen conversion) of equal to or greater than about 30%, equal to or greater than about 45%, or equal to or greater than about 60%; from about 30% to about 100%, from about 45% to about 99%, or from about 60% to about 97.5%.

In an aspect, the ODH reactor system 1 can be characterized by an ethane conversion (e.g., ethane overall conversion) of equal to or greater than about 60%, equal to or greater than about 65%, equal to or greater than about 70%, equal to or greater than about 75%, equal to or greater than about 80%, equal to or greater than about 85%, or equal to or greater than about 90%; from about 60% to about 100%, from about 65% to about 99.9%, from about 70% to about 99.5%, from about 75% to about 99%, from about 80% to about 98.5%, from about 85% to about 98%, or from about 90% to about 97.5%.

In an aspect, the ODH reactor system 1 can be characterized by an ethane conversion of equal to or greater than about 70%. For example, the ODH reactor system 1 can be characterized by an ethane conversion of equal to or greater than about 70%, equal to or greater than about 75%, equal to or greater than about 80%, equal to or greater than about 85%, or equal to or greater than about 90%; from about 70% to about 100%, from about 75% to about 99%, from about 80% to about 98.5%, from about 85% to about 98%, or from about 90% to about 97.5%.

The ODH reactor effluent stream 6 can be recovered from the ODH reactor system 1, wherein the ODH reactor effluent stream 6 can comprise ethylene, ethane, oxygen, carbon dioxide, and water. The ODH reactor effluent stream 6 can further comprise the ballast gas (e.g., methane), and optionally acetic acid, acetylene, CO, or combinations thereof. In an aspect, ethylene is not separated from the ODH reactor effluent stream 6; i.e., ethylene is not separated from the ethane in the ODH reactor effluent stream 6, prior to introducing the ethylene in the ODH reactor effluent stream 6 into the EO reactor 2.

In some aspects, the ODH reactor effluent stream 6 can be characterized by an ethane concentration of less than about 30 mol %, less than about 25 mol %, less than about 20 mol %, less than about 15 mol %, less than about 10 mol %, less than about 7.5 mol %, less than about 5 mol %, less than about 4 mol %, less than about 3 mol %, less than about 2 mol %, or less than about 1 mol %; from about 0.01 mol % to about 30 mol %, from about 0.02 mol % to about 25 mol %, from about 0.03 mol % to about 20 mol %, from about 0.04 mol % to about 15 mol %, from about 0.05 mol % to about 10 mol %, from about 0.07 mol % to about 7.5 mol %, or from about 0.1 mol % to about 5 mol %.

In an aspect, the ODH reactor effluent stream 6 can be characterized by an ethane concentration of less than about 5 mol %, or from about 0.1 mol % to about 5 mol %. For example, the ODH reactor effluent stream 6 can be characterized by an ethane concentration of less than about 5 mol %, less than about 4 mol %, less than about 3 mol %, less than about 2 mol %, or less than about 1 mol %; from about 0.1 mol % to about 5 mol %, from about 0.15 mol % to about 4 mol %, from about 0.2 mol % to about 3 mol %, from about 0.25 mol % to about 2 mol %, or from about 0.3 mol % to about 1 mol %.

Although ethane is not separated from the ethylene in the ODH reactor effluent stream 6, at least a portion of components other than ethylene, ethane, and oxygen may be separated from (e.g., removed from) ODH reactor effluent stream 6, prior to introducing the ethylene, ethane, and oxygen in the ODH reactor effluent stream 6 into the EO reactor 2.

In an aspect, at least a portion of the water and at least a portion of the acetic acid (if acetic acid is formed in the ODH reactor system 1) can be removed from the ODH reactor effluent stream 6, for example by condensation (e.g., lowering the stream temperature to promote condensation), to yield a dehydrated ODH reactor effluent stream.

In an aspect, at least a portion of the carbon dioxide can be removed from the ODH reactor effluent stream 6 and/or dehydrated ODH reactor effluent stream to yield a $CO_2$- depleted ODH reactor effluent stream 20, for example as displayed in the configuration of FIG. 2.

Referring to the configuration of FIG. 2, the ODH reactor effluent stream 6 and/or dehydrated ODH reactor effluent stream can be combined with one or more streams (e.g., a recycle stream, such as EO recycle feed stream 15; an EO oxygen make-up feed stream 14; optionally with a ballast gas make-up stream) to produce the EO reactor feed stream 7, wherein at least a portion of the EO reactor feed stream 7 can be subjected to $CO_2$ removal in the $CO_2$ removal system 4 prior to introducing to the EO reactor 2; and wherein the $CO_2$-depleted ODH reactor effluent stream 20 can be recovered from the $CO_2$ removal system 4 and introduced to the EO reactor 2. The $CO_2$ removal system 4 may employ any suitable carbon dioxide removal technology, such as amine, caustic, carbonate-based absorption, and the like, or combinations thereof. The $CO_2$-depleted ODH reactor effluent stream 20 may still contain $CO_2$, although at least 25 mol %, at least 35 mol %, at least 50 mol %, or at least 70 mol % of the $CO_2$ in the ODH reactor effluent stream 6 and/or dehydrated ODH reactor effluent stream is removed in the $CO_2$ removal system 4.

In an aspect, a process for producing EO as disclosed herein can comprise a step of introducing a second reactant mixture (e.g., EO reactor feed stream 7; $CO_2$-depleted ODH reactor effluent stream 20) to the EO reactor 2 to produce a second effluent stream (e.g., EO reactor effluent stream 8); wherein the second reactant mixture comprises at least a portion of the first effluent stream; and wherein the second effluent stream comprises EO, ethane, ethylene, and oxygen.

In some aspects, for example as displayed in the configuration of FIGS. 1-2, the ODH reactor effluent stream 6 and/or dehydrated ODH reactor effluent stream may be combined with one or more streams to produce the EO reactor feed stream 7. For example, the ODH reactor effluent stream 6 and/or dehydrated ODH reactor effluent stream may be combined with a recycle stream (e.g., EO recycle feed stream 15), an EO oxygen make-up feed stream 14, and optionally with a ballast gas make-up stream to produce the EO reactor feed stream 7. EO recycle feed stream 15 has substantially the same composition as the ODH recycle feed stream 16.

In an aspect, the second reactant mixture (e.g., EO reactor feed stream 7; $CO_2$-depleted ODH reactor effluent stream 20) can be characterized by an ethane concentration of less than about 30 mol %, less than about 25 mol %, less than about 20 mol %, less than about 15 mol %, less than about 10 mol %, less than about 9 mol %, less than about 8 mol %, less than about 7 mol %, less than about 6 mol %, less than about 5 mol %, less than about 4 mol %, less than about 3 mol %, less than about 2 mol %, or less than about 1 mol %; from about 0.01 mol % to about 30 mol %, from about 0.01 mol % to about 25 mol %, from about 0.01 mol % to about 20 mol %, from about 0.01 mol % to about 15 mol %, from about 0.01 mol % to about 10 mol %, from about 0.02 mol % to about 9 mol %, from about 0.05 mol % to about 8 mol %, from about 0.06 mol % to about 7 mol %, from about 0.08 mol % to about 6 mol %, from about 0.1 mol % to about 5 mol %, from about 0.1 mol % to about 4 mol %, from about 0.1 mol % to about 3 mol %, from about 0.15 mol % to about 2 mol %, or from about 0.2 mol % to about 1 mol %. In an aspect, the second reactant mixture (e.g., EO reactor feed stream 7; $CO_2$-depleted ODH reactor effluent stream 20) can be characterized by an ethane concentration of less than about 5 mol %, less than about 4 mol %, less than about 3 mol %, less than about 2 mol %, or less than about 1 mol %; from about 0.1 mol % to about 5 mol %, from about 0.1 mol % to about 4 mol %, from about 0.1 mol % to about 3 mol %, from about 0.15 mol % to about 2 mol %, or from about 0.2 mol % to about 1 mol %. In an aspect, the second reactant mixture (e.g., EO reactor feed stream 7; $CO_2$-depleted ODH reactor effluent stream 20) can be characterized by an ethane concentration of less than about 3 mol %; or from about 0.1 mol % to about 3 mol %. For example, the second reactant mixture (e.g., EO reactor feed stream 7; $CO_2$-depleted ODH reactor effluent stream 20) can be characterized by an ethane concentration of less than about 3 mol %, less than about 2 mol %, or less than about 1 mol %; from about 0.1 mol % to about 3 mol %, from about 0.15 mol % to about 2 mol %, or from about 0.2 mol % to about 1 mol %.

In an aspect, the second reactant mixture (e.g., EO reactor feed stream 7; $CO_2$-depleted ODH reactor effluent stream 20) can be characterized by an ethylene concentration of equal to or greater than about 15 mol %, equal to or greater than about 20 mol %, equal to or greater than about 25 mol %, or equal to or greater than about 30 mol %.

In an aspect, supplemental oxygen can be introduced to the EO reactor feed stream 7, in addition to the oxygen introduced to the EO reactor 2 via the EO recycle feed stream 15 and/or via the ODH reactor effluent stream 6. In an aspect, the EO oxygen make-up feed stream 14 can be provided to the EO reactor 2. Stream 14 can be oxygen gas, technical oxygen (which can contain some air), air, oxygen enriched air, and the like, or combinations thereof. In an aspect, stream 14 comprises substantially pure oxygen (e.g., oxygen having less than about 1 vol. % contaminants, such as nitrogen ($N_2$), argon (Ar), etc.). The EO oxygen make-up feed stream 14 provides for supplemental oxygen or fresh oxygen, which replenishes the oxygen that has been consumed (e.g., via ODH reaction in ODH reactor system 1, EO reaction in EO reactor 2, combustion reactions in ODH reactor system 1 and EO reactor 2, etc.) and/or lost (e.g., via purge stream 13) in the process.

In an aspect, a ballast gas make-up stream can be provided to the EO reactor 2. In an aspect, the ballast gas make-up stream introduced to the EO reactor 2 comprises methane.

In an aspect, the process for producing EO as disclosed herein can comprise introducing methane to the ODH reactor system 1 (e.g., via stream 19, as displayed in the configurations of FIGS. 1-2) and/or the EO reactor 2, wherein streams 10, 12, 13, 15, 7, 16, and 5 are characterized by a methane concentration of equal to or greater than about 20 mol %, equal to or greater than about 25 mol %, equal to or greater than about 30 mol %, equal to or greater than about 35 mol %, or equal to or greater than about 40 mol %.

As will be appreciated by one of skill in the art, and with the help of this disclosure, ballast gases may be inert gases introduced with other process feeds that build up in a recycle process. For example, argon and nitrogen may enter with the oxygen and/or ethane feeds to the ODH reactor system 1 and/or EO reactor 2 and can build up to appreciable concentrations in the recycle loop (e.g., streams 10, 12, 15, 7, 16, and 5). Ballast gases may be selected for their favorable properties (e.g., thermal performance, chemical inertness), and may also be purposely introduced into the recycle process (i.e., a process for producing EO as disclosed herein). Further, and as will be appreciated by one of skill in the art, and with the help of this disclosure, excess ethane in the EO reactor 2 (i.e., ethane that is not converted in the ODH reactor system 1) may also be considered a ballast gas, although it is not fully inert. In some aspects, the ballast gas may comprise atmospheric inerts, methane, ethane, or combinations thereof. Without wishing to be limited by theory, the concentrations of ballast gas components that are established in the recycle loop depend on the rate at which the ballast gas components enter into the process (i.e., feeds to the ODH reactor system 1 and/or EO reactor 2) and the flowrate of the purge stream 13 in which the ballast gas components leave the process. While ethane has been previously considered for use as a primary ballast gas in processes integrating ODH and EO, and without wishing to be limited by theory, ethane is not fully inert in the ODH reactor system 1 and the EO reactor 2, so allowing ethane to accumulate in the recycle loop leads to loss of ethane due to its reaction with oxygen, which in turn depresses the chemical efficiency of the process. Advantageously, inert gases other than ethane may be used to share the role of ballast gas. For example, if the oxygen feed used as streams 14 and 18 contains about 0.2 mol % argon, and a purge ratio f (f=flowrate of stream 13 divided by the flowrate of streams 10 or 12) is 0.001, argon can accumulate in the recycle loop to a level of greater than about 10 mol %. As another example, when methane is used as ballast gas in stream 19, at a molar flowrate equal to 1.3% of ethane feed stream 17, about 40% methane accumulates in the recycle loop. By employing inert gases other than ethane as the ballast gas, the concentration of ethane can be kept at a reasonable level in the recycle loop, e.g., below about 20 mol %, or below about 10 mol %.

The EO reactor 2 can be any suitable reactor, such as a continuous flow reactor, a fixed bed reactor, a fluidized bed reactor, a multitubular reactor, and the like, or combinations thereof. In an aspect, the ODH reactor system 1 comprises a continuous flow multitubular reactor, wherein the tubes contain an EO catalyst, and wherein a cooling medium contacting an outer surface of the tubes provides for temperature control of the EO reactor.

In an aspect, the EO reactor 2 can be characterized by an EO reactor operating temperature of from about 100° C. to about 400° C., from about 150° C. to about 350° C., or from about 200° C. to about 300° C. The EO reactor operating temperature is defined as the average of EO reactor inlet temperature and EO reactor outlet temperature.

In an aspect, the EO reactor 2 can be characterized by an EO reactor operating pressure of from about 1 barg to about 35 barg, from about 3 barg to about 30 barg, from about 5 barg to about 25 barg, or from about 10 barg to about 20 barg.

In an aspect, the EO reactor 2 comprises an EO catalyst. The EO catalyst comprises any EO catalyst suitable for catalyzing an EO reaction. For example, the EO catalyst can comprise silver. In an aspect, the EO catalyst comprises silver oxide. The EO catalyst may further comprise a promoter, such as rhenium, tungsten, molybdenum, chromium, and the like, or combinations thereof.

In an aspect, a moderator can be further introduced to the EO reactor 2. Generally, a moderator may be introduced to EO reactors comprising an EO catalyst for catalyst performance control. Nonlimiting examples of moderators suitable for use in the EO reactor as disclosed herein include a chlorohydrocarbon, ethyl chloride, vinyl chloride, dichloroethane, ethylene dichloride, and the like, or combinations thereof. In an aspect, the moderator comprises ethyl chloride. The moderator may be present in the EO reactor feed stream 7 in an amount of from about 1 part per million volume (ppmv) to about 2,000 ppmv, based on the total volume of the EO reactor feed stream 7. The EO reactor, EO catalyst, and EO operating conditions (e.g., pressure, temperature, moderator) are described in more detail in U.S. Pat. Nos. 8,148,555; and 9,649,621; each of which is incorporated by reference herein in its entirety.

The ethylene introduced to the EO reactor 2 contacts the EO catalyst and, in the presence of oxygen, is converted to EO via the EO reaction (2):

$$C_2H_4 + \tfrac{1}{2}O_2 \rightarrow C_2H_4O \qquad (2)$$

Several side reactions (i.e., reactions other than ethylene conversion to EO via EO reaction (2)) may occur in the EO reactor 2, such as CO oxidation to $CO_2$. Further, a portion of ethane, a portion of ethylene, a portion of acetic acid, a portion of acetylene, or combinations thereof in the EO reactor 2 can combust in the presence of oxygen to produce $CO_2$, and water.

The EO reactor effluent stream 8 can be recovered from the EO reactor 2, wherein the EO reactor effluent stream 8 can comprise EO, ethylene, ethane, oxygen, carbon dioxide, and water. The EO reactor effluent stream 8 can further comprise a ballast gas (e.g., methane) and/or a moderator. In an aspect, ethylene is not separated from the EO reactor effluent stream 8; i.e., ethylene is not separated from the ethane in the EO reactor effluent stream 8, prior to recycling the ethylene in the EO reactor effluent stream 8 to the ODH reactor system 1 and EO reactor 2.

In an aspect, a process for producing EO as disclosed herein can comprise a step of separating at least a portion of the second effluent stream (e.g., EO reactor effluent stream 8) into an EO product stream (e.g., EO product stream 9) and a recycle stream (e.g., EO-depleted product stream 10; $CO_2$-depleted stream 12); wherein the EO product stream comprises at least a portion of the EO in the second effluent stream; and wherein the recycle stream comprises ethane, ethylene, and oxygen.

In an aspect, at least a portion of the EO reactor effluent stream 8 can be introduced to the product recovery system 3 to produce the EO product stream 9 and the EO-depleted product stream 10; wherein the EO product stream 9 comprises EO and water, and wherein the EO-depleted product stream 10 comprises ethylene, ethane, oxygen, and carbon dioxide. The product recovery system 3 may employ condensation (e.g., lowering the stream temperature to promote condensation); a series of absorption and stripping columns; etc.

In some aspects, and referring to the configuration of FIG. 1, the EO-depleted product stream 10 can be introduced to the $CO_2$ removal system 4 to yield $CO_2$-depleted stream 12 and $CO_2$-containing stream 11. The $CO_2$-containing stream 11 can comprise at least 25 mol %, at least 35 mol %, at least 50 mol %, or at least 70 mol % of the $CO_2$ in the EO-depleted product stream 10. The $CO_2$-depleted stream 12 comprises ethylene, ethane, and oxygen; and optionally $CO_2$ (i.e., the $CO_2$ that has not been removed into $CO_2$-containing stream 11).

In an aspect, the recycle stream (e.g., EO-depleted product stream 10; $CO_2$-depleted stream 12) can be characterized by a combined concentration of ethane and ethylene of less than about 60 mol %, less than about 55 mol %, less than about 50 mol %, less than about 45 mol %, less than about 40 mol %, less than about 35 mol %, less than about 30 mol %, or less than about 25 mol %; from about 15 mol % to about 60 mol %, from about 16 mol % to about 55 mol %, from about 17 mol % to about 50 mol %, from about 18 mol % to about 45 mol %, from about 19 mol % to about 40 mol %, from about 20 mol % to about 35 mol %, from about 20 mol % to about 30 mol %, or from about 20 mol % to about 25 mol %.

In an aspect, the recycle stream (e.g., EO-depleted product stream 10; $CO_2$-depleted stream 12) can be characterized by an ethane concentration of less than about 30 mol %, less than about 25 mol %, less than about 20 mol %, less than about 15 mol %, less than about 10 mol %, less than about 9 mol %, less than about 8 mol %, less than about 7 mol %, less than about 6 mol %, less than about 5 mol %, less than about 4 mol %, less than about 3 mol %, less than about 2 mol %, or less than about 1 mol %; from about 0.01 mol % to about 30 mol %, from about 0.01 mol % to about 25 mol %, from about 0.01 mol % to about 20 mol %, from about 0.01 mol % to about 15 mol %, from about 0.01 mol % to about 10 mol %, from about 0.02 mol % to about 9 mol %, from about 0.05 mol % to about 8 mol %, from about 0.06 mol % to about 7 mol %, from about 0.08 mol % to about 6 mol %, from about 0.1 mol % to about 5 mol %, from about 0.1 mol % to about 4 mol %, from about 0.1 mol % to about 3 mol %, from about 0.15 mol % to about 2 mol %, or from about 0.2 mol % to about 1 mol %.

In an aspect, a purge stream 13 can be withdrawn from the EO-depleted product stream 10 and/or the $CO_2$-depleted stream 12, or from any other suitable stream in the recycle loop comprising units 1, 2, 3, and 4 in FIGS. 1-2, to avoid build-up of inerts in the recycle loop. A purge ratio (f) is defined as the volumetric flow rate of the purge stream 13 divided by the flow rate of the stream(s) it was withdrawn from (e.g., divided by the volumetric flow rate of the EO-depleted product stream 10 and/or the $CO_2$-depleted stream 12, respectively). In an aspect, the purge ratio can be from about 0.0001 to about 0.005, from about 0.0002 to about 0.003, or from about 0.0003 to about 0.002.

In an aspect, a process for producing EO as disclosed herein can comprise a step of recycling at least a portion (e.g., a first portion) of the recycle stream (e.g., EO-depleted product stream 10; $CO_2$-depleted stream 12) to the ODH reactor system 1 (e.g., via ODH reactor feed stream 5). In some aspects, the process for producing EO as disclosed herein can comprise recycling substantially all of the recycle stream to the ODH reactor system 1.

In an aspect, a process for producing EO as disclosed herein can comprise a step of recycling a portion (e.g., a second portion) of the recycle stream to the EO reactor 2 (e.g., via EO reactor feed stream 7).

In aspects where substantially all of the recycle stream is recycled to the ODH reactor system 1, the second portion of the recycle stream recycled to the EO reactor 2 is zero. In such aspect, a recycle split ratio (a) is 1; wherein the recycle split ratio is defined as the ratio of the volumetric flowrate of the first portion of the recycle stream divided by the sum of the volumetric flowrate of the first portion of the recycle stream and the volumetric flowrate of the second portion of the recycle stream.

Selection of the recycle split ratio depends on a trade-off in equipment cost and operating costs, and also depends on the characteristics of the specific catalyst employed in the ODH reactor 1, especially the reaction rate vis-à-vis the concentrations of oxygen and ethane, and the kinetics of side reactions (e.g., parasitic reactions). While some combinations of catalyst and operating conditions are most advantageously operated at a recycle split ratio of one, others exhibit the best performance at lower values of the recycle split ratio. In aspects where a portion (e.g., a second portion) of the recycle stream is recycled to the EO reactor 2 (e.g., via EO reactor feed stream 7), the recycle split ratio (a) can be less than about 1, less than about 0.9, less than about 0.8, less than about 0.7, less than about 0.6, less than about 0.5, less than about 0.45, less than about 0.4, less than about 0.35, less than about 0.3, less than about 0.25, or less than about 0.2, from about 0.1 to about 0.9, from about 0.2 to about 0.9, from about 0.25 to about 0.9, from about 0.2 to about 0.6, from about 0.3 to about 0.6, or from about 0.25 to about 0.45. In an aspect, the recycle split ratio can be less than about 0.6.

Purge stream 13 is withdrawn from the recycle stream (e.g., EO-depleted product stream 10; $CO_2$-depleted stream 12), and the remainder of the recycle stream is split into the EO recycle feed stream 15 (e.g., a second portion of the recycle stream) and the ODH recycle feed stream 16 (e.g., a first portion of the recycle stream). As disclosed herein, the EO recycle feed stream 15 (e.g., a second portion of the recycle stream) and the ODH recycle feed stream 16 (e.g., a first portion of the recycle stream) are recycled to the EO reactor 2 and the ODH reactor system 1, respectively without separating ethane from ethylene in the EO recycle feed stream 15 and the ODH recycle feed stream 16, respectively. As will be appreciated by one of skill in the art, and with the help of this disclosure, owing to relatively low conversions of ethylene in the EO reactors, processes for the production of EO generally operate at high recycle ratios (i.e., the flowrate of EO reactor feed stream is about 25-50 times the flowrate of fresh ethylene (in the case of a stand-alone EO process) or fresh ethane (in the case of an EO process integrated with ODH)), and thus conventional processes may separate the ethane from ethylene for recycling purposes. However, the process for producing EO as disclosed herein advantageously excludes the separation of ethane from ethylene from recycle streams (e.g., EO-depleted product stream 10; $CO_2$-depleted stream 12; EO recycle feed stream 15; ODH recycle feed stream 16).

In an aspect, a process for producing EO as disclosed herein can advantageously display improvements in one or more process characteristics when compared to conventional processes for the production of EO.

In an aspect, the EO in the EO product stream 9 can be further used as a chemical intermediate, for example for conversion to ethylene glycol and its derivatives.

In an aspect, a process for producing EO as disclosed herein can employ operating conditions for both the ODH reactor system and EO reactor that can be advantageously selected to optimize process performance. The EO reactor 2 may be operated with similar conditions (e.g., feed composition, pressure, inlet temperature, and coolant temperature) and similar design (e.g., including choice of catalyst) as in conventional EO processes. Alternatively, the EO reactor 2 may be operated at a different ethylene concentration in the inlet; for example, instead of the conventional concentration of 30-35% ethylene in the feed, somewhat lower ethylene concentrations, e.g., of 15-30%, or 15-25% may be advantageously employed in the EO reactor feed stream 7 under certain circumstances. The operating conditions for the ODH reactor system 1 may be selected to ensure process safety (which imposes a limit on the inlet concentration of oxygen, as well as the inlet and coolant temperatures) while maximizing reactor system performance and optimizing reactor size. In an aspect, both the ODH reactor system 1 and the EO reactor 2 can be operated with oxygen concentrations in their respective feed close to their maximum respective safe values, by advantageously maintaining separate oxygen make-up flows to each reactor.

In an aspect, as the recycle flow to the ODH reactor system 1 decreases, and assuming the oxygen concentration in the ODH feed is maintained at the maximum safe level to avoid flammable conditions, the fractional conversion of oxygen through the ODH reactor system 1 must increase in order to convert the required amount of ethane (i.e., close to the amount of fresh ethane fed to the ODH reactor system 1). The ODH reactor system may be advantageously operated at an overall oxygen conversion greater than about 30%, greater than about 45%, or greater than about 60%; from about 30% to about 100%, from about 45% to about 99%, or from about 60% to about 97.5%.

In an aspect, the ODH reactor system 1 as disclosed herein can advantageously employ boiling water as the cooling medium for maintaining the ODH reactor system operating temperature within a desired range, e.g., from about 270° C. to less than about 320° C., from about 270° C. to less than about 310° C., or from about 270° C. to less than about 300° C. It is generally desirable to use boiling water heat transfer for cooling in the process industry, for reasons of practicality, reactor system cost, and operating cost. In boiling-water systems, the recovered heat of reaction yields valuable steam, which can be readily used to heat other process streams, drive rotating equipment, produce electrical power, etc. Without wishing to be limited by theory, the use of boiling water is limited by thermodynamics (liquid water does not exist above its critical temperature, 374° C.) and practical constraints (steam pressure increases with temperature; for example, at temperatures above 312° C., the steam pressure rises above 100 barg). In industrial practice, boiling water can typically be used up to temperatures of about 310° C., while heat transfer oils can be used at slightly higher temperatures, e.g., up to about 340° C. Above these temperature levels (e.g., about 340° C.), melts of nitrate or carbonate salts are typically used; however, salt melts as heat transfer media have many disadvantages, such as being solid at room temperature, often requiring intermediate heat exchangers to extract the value of the reaction heat.

As will be appreciated by one of skill in the art, and with the help of this disclosure, and without wishing to be limited by theory, partial oxidation reactors (e.g., conventional ODH reactors) are prone to thermal runaway or heat runaway: the heat released as the exothermic oxidation reaction proceeds increases the temperature of the reaction mixture, which in turn increases the rate of reaction (i.e., the rate of the desired oxidation reaction), and also the rate of undesired side reactions (e.g., combustion reactions, parasitic reactions, etc.), which are often even more energetic (i.e., more exothermic, release more heat than the desired oxidation reaction). Increasing the rate of the reaction leads to self-accelerating reactions, which could result in heat runaway. Self-accelerating reactions have the potential to overpower the means of cooling, and therefore partial oxidation reactors should be carefully designed to maintain highly effective cooling (e.g., by providing a large heat transfer surface area). Further, for a partial oxidation reactor to be operating in a controlled fashion (e.g., without thermal runaway), the temperature at which the reaction takes place in the reactor or catalyst bed (i.e., the catalyst temperature or process-side gas temperature) should not significantly exceed the cooling medium temperature; e.g., the difference between the cooling medium temperature and the reactor operating temperature should be less than about 50° C., less than about 40° C., less than about 30° C., less than about 20° C., or less than about 10° C. Consequently, a low-temperature coolant (e.g., water boiling at less than about 250° C.) cannot be effectively and safely used to cool a partial oxidation reaction occurring at, for example, about 300° C. Furthermore, and as will be appreciated by one of skill in the art, and with the help of this disclosure, there is often a temperature maximum ("hot spot") along the length of a cooled reactor (e.g., along the length of a catalyst bed in a cooled reactor), at which the process temperature exceeds both the reactor inlet temperature (e.g., ODH reactor system inlet temperature) and the reactor outlet temperature (e.g., ODH reactor system outlet temperature), both of which may be relatively close to the cooling medium temperature.

Consequently, in order for boiling water to be used as the cooling medium for the ODH reactor system 1, the ODH reactor system operating temperature (as characterized by the inlet and outlet temperatures) may not be significantly higher than about 310° C.-320° C., although a hot spot of somewhat higher temperature, e.g., 330° C.-340° C., may occur within the ODH reactor (i.e., within the ODH catalyst bed). Previously it has been suggested to operate ODH reactors at higher temperatures (e.g., greater than about 310° C.-320° C.); and hence heat transfer methods other than using boiling water have been previously considered, but the previously proposed heat transfer means are less convenient and economical than boiling water.

However, the ODH reactor system as disclosed herein can surprisingly and advantageously operate in an efficient manner at temperature ranges of 270° C.-320° C., or 270° C.-310° C., by using the ODH catalyst as disclosed herein at a relatively high ODH operating pressure. At relatively high pressure (e.g., 10-20 barg) the rate of the ODH reaction accelerates, which allows conversion of ethane and oxygen to occur at lower temperatures than would be otherwise expected at lower pressure levels. In addition to the advantages of using boiling water heat transfer, operating the ODH reactor system as disclosed herein at a relatively low temperature (e.g., ODH reactor system operating temperature) may provide the advantage of promoting greater selectivity towards the desired product (i.e., ethylene) and lower selectivity towards less desired products (e.g., CO, $CO_2$, oxygenates such as acetic acid).

In an aspect, the ODH reactor system 1 as disclosed herein can advantageously comprise a multitubular reactor comprising a plurality of substantially parallel tubes that pass through an enclosed shell. Conventionally, catalyst may be present inside the tubes of a multitubular reactor, with coolant (e.g., cooling medium) flowing outside of the tubes within the shell. Alternatively, catalyst may be present on the shell side, with coolant flowing through the tubes (in which case, the distinction of the tubes being substantially parallel need not apply; the tubes can be coiled, wound, or otherwise arranged for maximum heat transfer effectiveness). If the boiling water coolant is used on the shell side of a multitubular reactor, the reactor shell should be designed to contain the pressure of the steam that is generated (up to about 100 bar). In configurations where the cooling medium is employed on the tube-side (i.e., inside the tubes), the tubes must be designed to contain the associated pressure (up to about 100 bar), while the reactor shell must be designed to contain the process-side (e.g., catalyst-side) pressure (e.g., up to 30 bar).

In an aspect, the ODH reactor system 1 as disclosed herein can advantageously comprise a reactor system that combines two or more non-cooled ODH stages in series (e.g., adiabatic ODH stages), with interstage cooling. Such non-cooled ODH stages may be operated substantially adiabatically, such that the reaction mixture absorbs the heat of reaction and emerges at the outlet at a higher temperature than at the inlet. Even more so than cooled ODH stages, adiabatic ODH stages are prone to thermal runaway, owing to the operating temperature not being controlled inside the ODH stage with a heat transfer medium, such as a cooling medium; and it would be difficult to limit the conversion to a desired value without the benefit of temperature control. Hence, when the ODH reactor system 1 comprises two or more non-cooled ODH stages in series, the extent of reaction through each ODH stage can be advantageously controlled by limiting the supply of at least one of the reactants (e.g., ethane or oxygen), and allowing this limiting reactant to be substantially fully converted in that particular ODH stage. In the integrated process for the production of EO as disclosed herein, the staged reactant in ODH may be ethane or oxygen. In some aspects, it may be advantageous to use ethane as the limiting reactant in the ODH reactor system 1 comprising two or more adiabatic ODH stages in series. Fresh ethane feed (e.g., stream 17 in FIGS. 1-2) can be divided into two or more streams, one of which is delivered to the feed to the first (e.g., initial) ODH stage, and the other streams derived from stream 17 can be fed at points intermediate between successive stages. The oxygen feed (e.g., stream 18 in FIGS. 1-2) may also be staged. By staging the oxygen feed, the oxygen concentration in each ODH stage can be maintained in a controlled manner at the maximum allowable level, thus minimizing the ODH stage size. However, staging the oxygen feed is not necessary, as long as the concentration of oxygen in each of the ODH stages is greater than the oxygen concentration required to convert substantially all the ethane in the feed to each ODH stage. The number of ODH reactor system stages can be further determined by practical considerations, such as the maximum allowable temperature rise through any one ODH stage. In aspects where the ODH reactor system 1 comprises two or more adiabatic ODH stages in series, the heat of reaction is removed after each stage in heat exchangers that are not integrated with the catalyst beds in the ODH stages. However, when employing interstage cooling, the effectiveness of cooling is not what directly prevents thermal runaway to unsafe conditions, and thus it may no longer be necessary to select a coolant temperature that is close to the ODH operating temperature. For example, if the effluent from the first ODH stage is about 330° C. and the intended inlet temperature to the second ODH stage is about 280° C., a boiling-water coolant system operating at 260° C. may be employed for cooling the effluent from the first ODH stage. Therefore, the ODH operating temperature may be chosen to be well above the desired coolant temperature, while maintaining the advantage of using boiling water as the coolant. Further, it may still be advantageous to operate the ODH stages at relatively low temperatures, because relatively low ODH operating temperatures may promote relatively high selectivity towards ethylene.

In some aspects, the staged adiabatic ODH reactor system may employ oxygen as the limiting reactant, wherein the ODH reaction system configuration is similar to the configuration of the staged adiabatic ODH reactor system that employs ethane as the limiting reactant. However, when oxygen is employed as the limiting reactant in the ODH stages, ethane will be in excess in the ODH reactor system, and as such the level of ethane in the first effluent stream (e.g., ODH reactor effluent stream 6) will be relatively higher when compared to the level of ethane in the first effluent stream in the case of using ethane as the limiting reagent in the staged adiabatic ODH reactor system. Further, some ODH catalysts may be sensitive to oxygen-starved conditions, so in those cases (e.g., for those specific ODH catalysts) it may not be advisable to allow oxygen to react to extinction in the ODH stages.

In an aspect, an additional advantage of the staged adiabatic ODH reactor system with ethane as limiting reactant can be that the concentration of ethane at the outlet of each of the ODH stages, including the final ODH stage, will be relatively low. Maintaining a relatively low concentration of ethane in the feed to the EO reactor 2 and in the recycle loop has several advantages in terms of EO yield and EO reactor operation, as disclosed herein.

In an aspect, a process for producing EO as disclosed herein can advantageously employ a relatively low ethane concentration in the recycle loop and in the feed to the EO reactor 2. Ethane is not fully inert in the EO reactor 2, so allowing ethane to accumulate leads to loss of ethane due to its reaction with oxygen, which undesirably depresses the chemical efficiency of the process. Given a relatively high rate of recycle in the process, even a small fractional loss of ethane in the EO reactor can lead to a significant reduction of the overall EO yield.

Some valuable components of the recycle stream can be inevitably lost via the purge stream 13. Consequently, it may be advantageous to minimize the value of the purge ratio (f). However, there is a minimum suitable purge ratio, depending on process conditions; for example, the minimum value of the purge ratio may be determined by the need to restrict the accumulation of atmospheric inerts in the recycle stream, which may adversely affect reactor operation. Given a minimum acceptable value of the purge ratio, the greater the concentration of ethane in the recycle stream, the greater the loss of ethane. Ethane, as primary feedstock, is more valuable (especially on a molar basis) than methane or other ballast gas components. Hence, it may be advantageous to operate at a low ethane concentration in the recycle loop.

By employing methane as ballast gas in stream 19, greater than about 40% methane may accumulate in the recycle loop. Thus, by employing inert gases other than ethane as the ballast gas, the concentration of ethane can be kept at a reasonable level in the recycle loop, e.g., below about 5 mol %, below about 4 mol %, below about 3 mol %, or below about 2 mol %. Further, having a relatively low ethane concentration in the feed to the EO reactor 2 requires a relatively low concentration of ethane in the ODH reactor effluent stream 6 (given that at least a portion of stream 6 is fed to the EO reactor 2), which in turn requires that the fractional conversion of ethane in the ODH reactor system 1 must be relatively high, for example greater than about 60%, or greater than about 70%.

In an aspect, a process for producing EO as disclosed herein can employ ODH catalysts, EO catalysts, and moderators as previously described herein. Without wishing to be limited by theory, ideally, the ODH catalyst in the ODH reactor system 1 would only act on ethane, and would not convert ethylene; and likewise, under ideal assumptions, the EO catalyst in the EO reactor 2 would only act on ethylene, and would not convert ethane. In reality, some small fractional conversion of these compounds (ethylene in the ODH reactor system; ethane in the EO reactor 2) may take place over the catalysts employed; and these fractional conversions may be referred to as "parasitic" conversions, which are the result of parasitic reactions (e.g., unwanted reactions). The process for producing EO as disclosed herein advantageously gives rise to relatively low-level parasitic conversions, which in turn leads to improved process characteristics (e.g., relatively high EO yield). However, relatively low-level parasitic conversions can be accomplished by minimizing the concentration of ethane in the recycle streams and/or by selecting an appropriately low value of the recycle split to the ODH reactor system 1. In an aspect, a process for producing EO as disclosed herein can advantageously provide for reducing the operating cost of the ODH reactor system 1.

In an aspect, a process for producing EO as disclosed herein can advantageously provide for a relatively high ethylene oxide yield, while balancing the competing objective of low equipment cost. Ethylene oxide yield (defined as the molar fraction of the fresh feed of ethane that is converted (in the sequence of the ODH and EO reactors) to the EO product) is the most important parameter affecting the operating cost of EO production. The practical value (as opposed to the theoretical value) is smaller than 100%, owing to imperfect selectivity towards desired products in the ODH and EO reactors, ethane and ethylene losses in purge stream(s), and in some cases parasitic conversion of ethane in the EO reactor and/or ethylene in the ODH reactor. In a process integrating ODH and EO for EO production, such as the process for producing EO as disclosed herein, the cost of ODH and EO reactors can represent a large fraction of the equipment cost, since expensive cryogenic separation of ethylene from ethane in the recycle loop is advantageously avoided. In an aspect, a process for producing EO as disclosed herein can advantageously provide for optimizing reactor size and cost. Additional advantages of the process for producing EO as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Example 1

Figure 3:
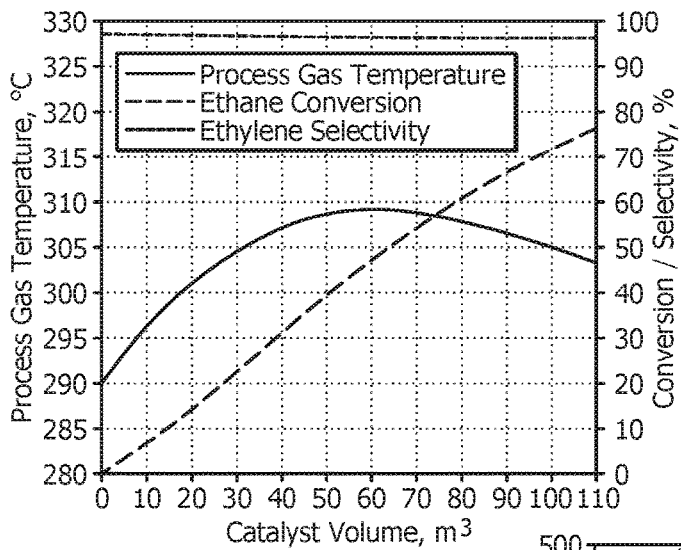
FIGS. 3, 4, 5, 6, and 7 display the variation of an oxidative dehydrogenation (ODH) reactor system temperature, conversion and selectivity with the ODH catalyst volume for various configurations of the ODH reactor system.

A mathematical model of a conventional multitubular reactor cooled by boiling water on the shell side was constructed, using conventional assumptions for heat transfer from the catalyst-containing tubes, with tube diameter of 2 inches. The mathematical model used the following reaction kinetics considerations. To describe the reaction kinetics of the ODH chemistry, a power-law kinetic model was fit to publicly available experimental results for conversions and selectivities over a catalyst comprising Mo, V, Nb, Te, and Sb. The model was characterized by positive, below-unity reaction orders in both ethane and oxygen partial pressure, for both the desired reaction to ethylene and the side reaction to CO and/or $CO_2$. The latter has the higher activation energy, consistent with deteriorating selectivity towards ethylene as temperature increases. The model was first applied to a case characterized by an ODH reactor feed containing 8.5% oxygen, 4.4% ethane, 33.0% ethylene and 54.1% methane, at a total flow rate of $5.8 \times 10^4$ kmol/hr, with feed gas entering the reactor at an inlet temperature of 290° C. and pressure of 20 bar(abs). The coolant temperature in this case was also 290° C., which is within the capability of boiling water. This feed composition corresponds to a favorable composition in the integrated recycle process for producing EO as disclosed herein. An ethane conversion of 75% in this ODH multitubular reactor was required for optimal process performance. For comparing reactor sizes, a conventionally designed EO reactor that would complement this reactor to produce 700,000 ton/year of EO has a catalyst volume of about 380 m³, which is close to the practical size limit for multitubular reactors. FIG. 3 shows the profiles of temperature, ethane conversion, and selectivity towards ethylene against the catalyst volume in the ODH multitubular reactor. The data in FIG. 3 demonstrate that the reaction temperature is controlled with a hotspot temperature of 309° C. The overall net ethylene selectivity was about 97%. The ODH catalyst volume required to achieve 75% conversion in this case was 110 m³. It should be noted that this ODH multitubular reactor can be operated in stable fashion: other than the hot spot, the temperature approached the coolant temperature, with both temperature and conversion varying smoothly with catalyst volume as the conversion reached its target.

Example 2

Figure 4:
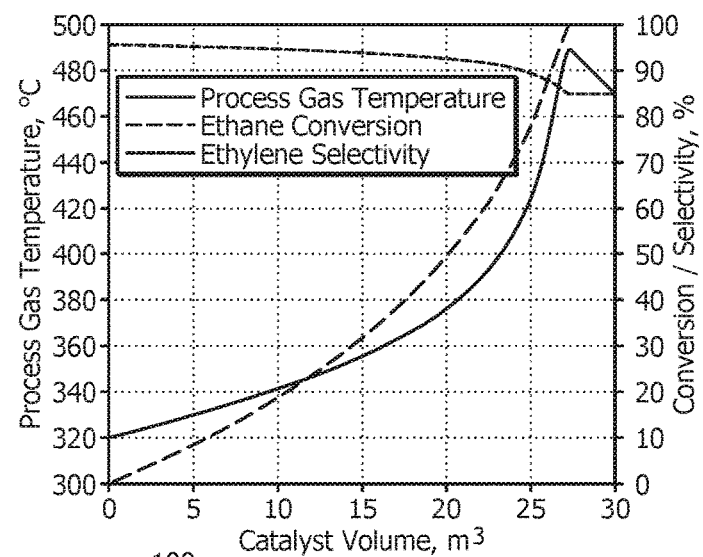

The reactor model described in Example 1 was used for a case with the same ODH reactor feed composition, flow rate and pressure as in Example 1, but using an inlet temperature and a coolant temperature of 320° C. The model used the same reaction kinetics as described in Example 1. The calculated profiles of temperature, conversion, and selectivity are shown in FIG. 4. FIG. 4 illustrates that thermal runaway occurs in this case: as the conversion approaches its desired value of 75%, the process gas temperature is rising rapidly. In this situation, even a slight variation in operating conditions (such as feed flow rate) can give rise to a severe temperature overshoot to 490° C., with correspondingly low selectivity and the potential of further runaway through high-temperature reaction of ethylene with oxygen. Although full conversion of ethane is achieved in a small catalyst volume, the overall net ethylene selectivity is only about 85%, and the reactor cannot be operated in a safe and stable manner.

Example 3

Figure 5:
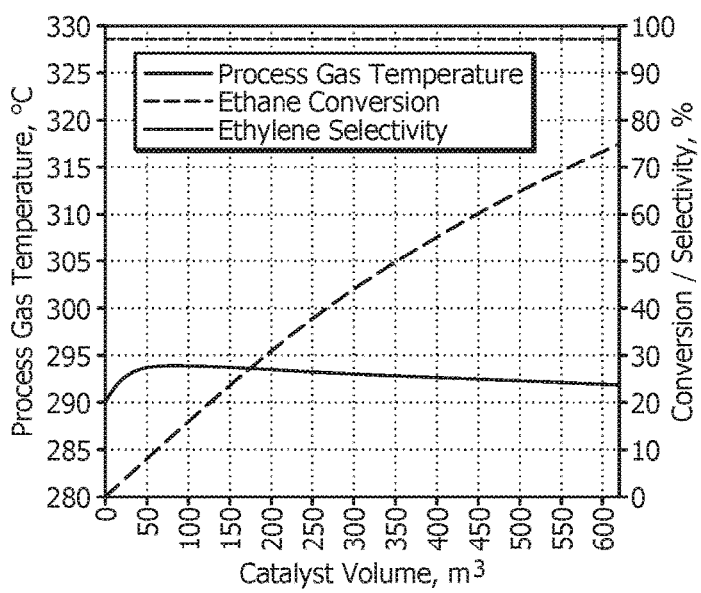

The reactor model described in Example 1 was used for a case with the same ODH reactor feed composition, flow rate, inlet temperature and coolant temperature as in Example 1, but with an operating pressure of 5 bar(abs), and the data are displayed in FIG. 5. The lower pressure leads to a lower rate of reaction, which results in a cooler hotspot of 294° C. In this case, the catalyst volume required to achieve 75% ethane conversion is more than 600 m³, which is unpractically large.

Examples 1, 2, and 3 illustrate that for the reported catalyst performance and a reasonable reactor design, a reactor operating temperature below 320° C. yields an attractive design that can be safely operated, while operation at higher temperatures can lead to thermal runaway. This temperature range yields a practical design only at the higher pressures of typical industrial interest, and is not evident when attempting to design a reactor based on reaction rates measured at lower pressure.

Example 4

Figure 6:
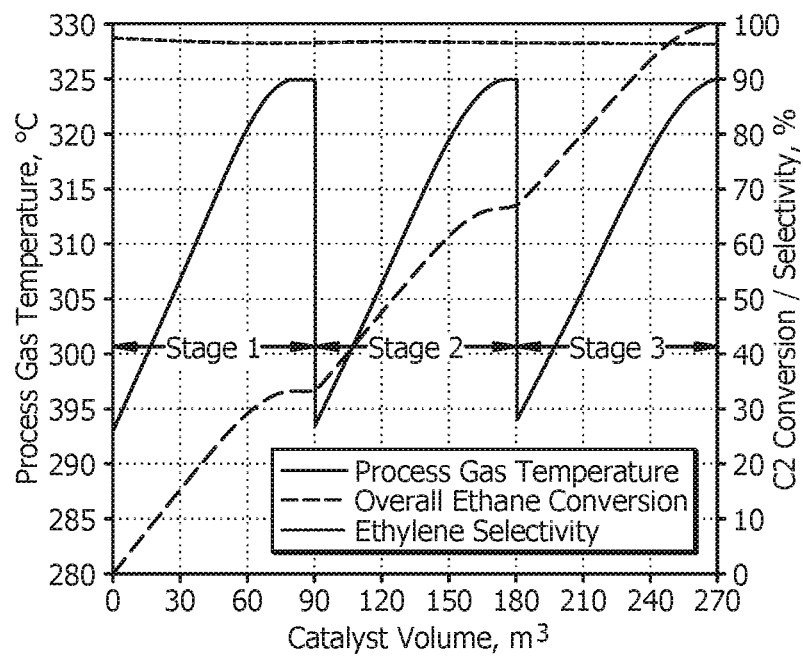

A mathematical model of a conventional adiabatic packed bed reactor was constructed, using the same reaction kinetics as described in Example 1. The model was applied to a case of three equally sized reactors in a series configuration, the first in sequence receiving an ODH reactor feed containing $4.9 \times 10^3$ kmol/hr oxygen, $1.9 \times 10^4$ kmol/hr ethylene, and $3.1 \times 10^4$ kmol/hr methane. An ethane feed of $2.5 \times 10^3$ kmol/hr was split into three equal portions, added to the feed of each of the three reactors. These feed conditions were selected to accomplish the same overall production rate of EO as in Example 1 in an integrated process for producing EO from ethane. The temperature of the feed to each reactor was 293° C. (i.e., the effluent of the first and second reactors was cooled to the original feed temperature), and the pressure was 20 bar(abs). Profiles of process gas temperature, ethane conversion, and selectivity towards ethylene are shown in FIG. 6. Each reactor achieves nearly full conversion of the ethane in its feed, thereby heating the process gas to an outlet temperature of 325° C. The maximum reaction temperature attained was limited by the amount of ethane in the feed, which can be readily controlled. The overall net ethylene selectivity was about 96%. For the given flow rate, this sequence required 90 m³ catalyst in each stage, totaling 270 m³ catalyst, to achieve full conversion of ethane. The total catalyst volume is still below that of the corresponding EO reactor, and the reactor system can be operated safely at this choice of temperatures (average operating temperature of 309° C.).

Example 5

Figure 7:
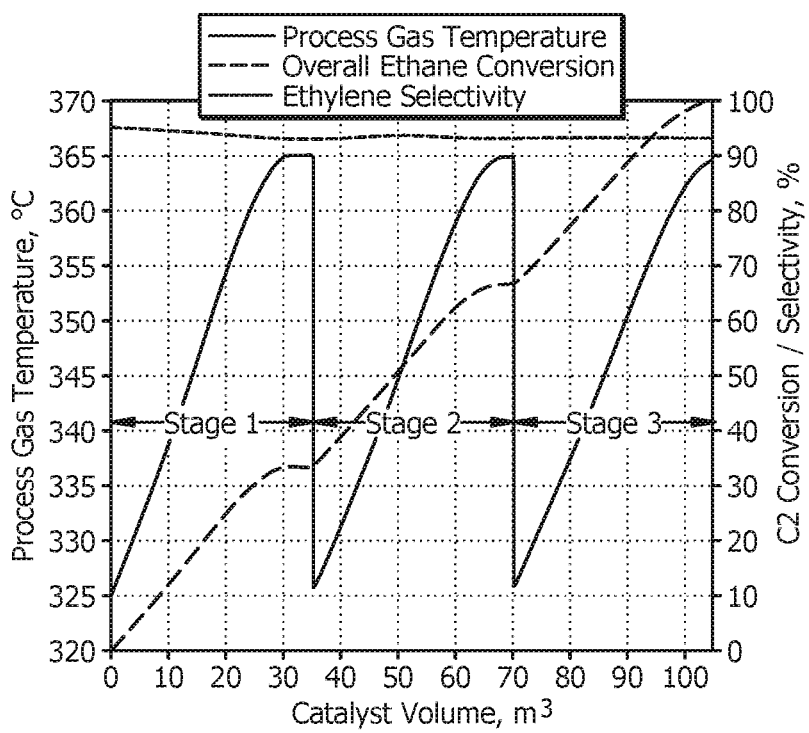

The mathematical model of Example 4 was used to model a case with different temperature conditions, as follows. The temperature of the feed to each reactor was 325° C. (i.e., the effluent of the first and second reactors was cooled to the original feed temperature), and the pressure was 20 bar(abs). Profiles of process gas temperature, ethane conversion, and selectivity towards ethylene are shown in FIG. 7. Each reactor achieves nearly full conversion of the ethane in its feed, thereby heating the process gas to an outlet temperature of 365° C. The maximum reaction temperature attained was limited by the amount of ethane in the feed, which can be readily controlled. The overall net ethylene selectivity was about 93%. For the given flow rate, this sequence required 35 m³ catalyst in each stage, totaling 105 m³ catalyst, to achieve full conversion of ethane. In this case, a much smaller amount of catalyst (and therefore, a smaller reactor size) is needed, while the selectivity is only slightly reduced compared to Example 4.

Additional Disclosure

A first embodiment, which is an ethylene oxide (EO) production process comprising: (a) introducing a first reactant mixture to a first reactor system to produce a first effluent stream; wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture; wherein the first reactor system is characterized by a first reactor system operating temperature; wherein the first reactor system operating temperature is defined as the average of first reactor system inlet temperature and first reactor system outlet temperature; wherein the first reactor system operating temperature is from about 270° C. to about 320° C.; wherein the first reactor system comprises one or more oxidative dehydrogenation (ODH) stages; wherein each ODH stage is characterized by an ODH stage operating temperature; and wherein each ODH stage operating temperature is defined as the average of ODH stage inlet temperature and ODH stage outlet temperature for that particular ODH stage; (b) introducing a second reactant mixture to a second reactor to produce a second effluent stream; wherein the second reactant mixture comprises at least a portion of the first effluent stream; and wherein the second effluent stream comprises EO, ethane, ethylene, and oxygen; (c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and (d) recycling at least a portion of the recycle stream to the first reactor system in step (a), and optionally a portion of the recycle stream to the second reactor in step (b).

A second embodiment, which is the process of the first embodiment, wherein each ODH stage operating temperature is from about 270° C. to about 320° C.

A third embodiment, which is the process of any of the first and the second embodiments, wherein the first reactor system operating temperature and each ODH stage operating temperature are from about 270° C. to less than about 300° C.

A fourth embodiment, which is the process of any of the first through the third embodiments, wherein the first reactor system comprises a multitubular reactor, and wherein the multitubular reactor comprises a shell and a plurality of tubes disposed inside the shell.

A fifth embodiment, which is the process of the fourth embodiment, wherein the plurality of tubes are substantially parallel to each other; wherein each tube comprises an ODH catalyst disposed therein; wherein the first reactant mixture is introduced to each of the plurality of tubes; wherein the multitubular reactor comprises a cooling medium contacting an inside shell surface and an outside surface of the tubes; wherein the cooling medium comprises water and/or heat transfer oil; and wherein the cooling medium maintains the first reactor system operating temperature within a range of from about 270° C. to about 320° C.

A sixth embodiment, which is the process of the fourth embodiment, wherein each of the plurality of the tubes conveys a cooling medium contacting an inside surface of the tubes; wherein the cooling medium comprises water and/or heat transfer oil; wherein the first reactor system comprises an ODH catalyst disposed inside the shell and outside of the tubes; wherein the first reactant mixture is introduced inside the shell and outside of the tubes; and wherein the cooling medium maintains the first reactor system operating temperature within a range of from about 270° C. to about 320° C.

A seventh embodiment, which is the process of any of the fifth and the sixth embodiments, wherein the cooling medium comprises boiling water; wherein the boiling water is characterized by a temperature of from about 260° C. to about 310° C.; and wherein the cooling medium maintains the first reactor system operating temperature within a range of from about 270° C. to less than about 320° C.

An eighth embodiment, which is the process of any of the fifth through the seventh embodiments, wherein the cooling medium comprises boiling water; wherein the boiling water is characterized by a temperature of from about 260° C. to about 295° C.; and wherein the cooling medium maintains the first reactor system operating temperature within a range of from about 270° C. to less than about 300° C.

A ninth embodiment, which is the process of any of the first through the third embodiments, wherein the first reactor system comprises two or more ODH stages in series; wherein an ODH stage effluent is recovered from each ODH stage; wherein at least one ODH stage is substantially adiabatic; and wherein the ODH stage effluent is cooled prior to introducing it to a downstream ODH stage.

A tenth embodiment, which is the process of the ninth embodiment further comprising (1) interstage effluent cooling between any two consecutive ODH stages in series; and/or (2) interstage ethane addition and/or interstage oxygen addition to the first reactor system.

An eleventh embodiment, which is the process of any of the first through the tenth embodiments, wherein ethylene is not separated from the first effluent stream; and wherein ethylene is not separated from the recycle stream.

A twelfth embodiment, which is the process of any of the first through the eleventh embodiments, wherein a recycle split ratio is less than about 0.6; and wherein the recycle split ratio is defined as the ratio of the volumetric flowrate of the portion of the recycle stream recycled to the first reactor system divided by the sum of the volumetric flowrate of the portion of the recycle stream recycled to the first reactor system and the volumetric flowrate of the portion of the recycle stream recycled to the second reactor.

A thirteenth embodiment, which is the process of any of the first through the twelfth embodiments, wherein (1) the first reactant mixture is characterized by a molar ratio of ethylene to ethane of from about 1.3 to about 3.0; (2) the first effluent stream is characterized by an ethane concentration of from about 0.1 mol % to about 5 mol %; (3) the first reactor system is characterized by an ethane conversion of from about 60% to about 100%; (4) the first reactor system is characterized by an oxygen conversion of from about 30% to about 100%; (5) a concentration of ethane in the second reactant mixture and/or the recycle stream is from about 0.1 mol % to about 3 mol %; (6) the recycle stream is characterized by a combined concentration of ethane and ethylene of from about 15 mol % to about 60 mol %; or (7) any combinations of (1)-(6).

A fourteenth embodiment, which is the process of any of the first through the thirteenth embodiments further comprising withdrawing a portion of the recycle stream as a purge stream; wherein the purge stream is characterized by a purge ratio of from about 0.0001 to about 0.005; and wherein the purge ratio is defined as the ratio of the volumetric flowrate of the purge stream divided by the volumetric flowrate of the recycle stream.

A fifteenth embodiment which is an ethylene oxide (EO) production process comprising: (a) introducing a first reactant mixture to an oxidative dehydrogenation (ODH) reactor system to produce a first effluent stream; wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture; wherein the ODH reactor system is a multitubular reactor; wherein the multitubular reactor comprises a shell and a plurality of tubes disposed inside the shell; wherein the plurality of tubes are substantially parallel to each other; wherein each tube comprises an ODH catalyst disposed therein; wherein the first reactant mixture is introduced to each of the plurality of tubes; wherein the multitubular reactor comprises a cooling medium contacting an inside shell surface and an outside surface of the tubes; wherein the cooling medium comprises boiling water; and wherein the boiling water is characterized by a temperature of from about 260° C. to about 310° C.; (b) introducing a second reactant mixture to an EO reactor to produce a second effluent stream; wherein the second reactant mixture comprises at least a portion of the first effluent stream; and wherein the second effluent stream comprises EO, ethane, ethylene, and oxygen; (c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and (d) recycling at least a portion of the recycle stream to the ODH reactor system in step (a), and optionally a portion of the recycle stream to the EO reactor in step (b).

A sixteenth embodiment, which is the process of the fifteenth embodiment, wherein the cooling medium maintains the ODH reactor system operating temperature within a range of from about 270° C. to less than about 320° C.; and wherein the ODH reactor system operating temperature is defined as the average of ODH reactor system inlet temperature and ODH reactor system outlet temperature.

A seventeenth embodiment, which is the process of any of the fifteenth and the sixteenth embodiments, wherein the cooling medium comprises boiling water; and wherein the boiling water is characterized by a temperature of from about 260° C. to about 310° C.

An eighteenth embodiment, which is the process of any of the fifteenth through the seventeenth embodiments, wherein the ODH reactor system is characterized by an ODH reactor system operating temperature of from about 270° C. to less than about 300° C.; and wherein the ODH reactor system operating temperature is defined as the average of ODH reactor system inlet temperature and ODH reactor system outlet temperature.

A nineteenth embodiment, which is an ethylene oxide (EO) production process comprising: (a) introducing a first reactant mixture to an oxidative dehydrogenation (ODH) reactor system to produce a first effluent stream; wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture; wherein the ODH reactor system is characterized by an ODH reactor system operating temperature; wherein the ODH reactor system operating temperature is defined as the average of ODH reactor system inlet temperature and ODH reactor system outlet temperature; wherein the ODH reactor system comprises two or more ODH stages in series; wherein at least one ODH stage is substantially adiabatic; wherein an ODH stage effluent is recovered from each ODH stage; wherein the ODH stage effluent is cooled prior to introducing it to a downstream ODH stage; and wherein each ODH stage is characterized by an ODH stage operating temperature; wherein each ODH stage operating temperature is defined as the average of ODH stage inlet temperature and ODH stage outlet temperature for that particular ODH stage; (b) introducing a second reactant mixture to an EO reactor to produce a second effluent stream; wherein the second reactant mixture comprises at least a portion of the first effluent stream; and wherein the second effluent stream comprises EO, ethane, ethylene, and oxygen; (c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and (d) recycling at least a portion of the recycle stream to the ODH reactor system in step (a), and optionally a portion of the recycle stream to the EO reactor in step (b).

A twentieth embodiment, which is the process of the nineteenth embodiment, wherein boiling water is used to provide for cooling the ODH stage effluent prior to introducing it to a downstream ODH stage.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. An ethylene oxide (EO) production process comprising:
   (a) introducing a first reactant mixture to a first reactor system to produce a first effluent stream;
      wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture;
      wherein the first reactor system is characterized by a first reactor system operating temperature; wherein the first reactor system operating temperature is defined as the average of first reactor system inlet temperature and first reactor system outlet temperature; wherein the first reactor system operating temperature is from about 270° C. to about 320° C.;
      wherein the first reactor system comprises one or more oxidative dehydrogenation (ODH) stages; wherein each ODH stage is characterized by an ODH stage operating temperature; and wherein each ODH stage operating temperature is defined as the average of ODH stage inlet temperature and ODH stage outlet temperature for that particular ODH stage;
   (b) introducing a second reactant mixture to a second reactor to produce a second effluent stream;
      wherein the second reactant mixture comprises at least a portion of the first effluent stream;
      and wherein the second effluent stream comprises EO, ethane, ethylene, and oxygen;
   (c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and
   (d) recycling at least a portion of the recycle stream to the first reactor system in step (a) without separating ethylene from the recycle stream prior to the recycling, and optionally recycling a portion of the recycle stream to the second reactor in step (b).

2. The process of claim 1, wherein each ODH stage operating temperature is from about 270° C. to about 320° C.

3. The process of claim 1, wherein the first reactor system operating temperature and each ODH stage operating temperature are from about 270° C. to less than about 300° C.

4. The process of claim 1, wherein the first reactor system comprises a multitubular reactor, and wherein the multitubular reactor comprises a shell and a plurality of tubes disposed inside the shell.

5. The process of claim 4, wherein the plurality of tubes are substantially parallel to each other; wherein each tube comprises an ODH catalyst disposed therein; wherein the first reactant mixture is introduced to each of the plurality of tubes; wherein the multitubular reactor comprises a cooling medium contacting an inside shell surface and an outside surface of the tubes; wherein the cooling medium comprises water and/or heat transfer oil; and wherein the cooling medium maintains the first reactor system operating temperature within a range of from about 270° C. to about 320° C.

6. The process of claim 4, wherein each of the plurality of the tubes conveys a cooling medium contacting an inside surface of the tubes; wherein the cooling medium comprises water and/or heat transfer oil; wherein the first reactor system comprises an ODH catalyst disposed inside the shell and outside of the tubes; wherein the first reactant mixture is introduced inside the shell and outside of the tubes; and wherein the cooling medium maintains the first reactor system operating temperature within a range of from about 270° C. to about 320° C.

7. The process of claim 5, wherein the cooling medium comprises boiling water;
   wherein the boiling water is characterized by a temperature of from about 260° C. to about 310° C.;
   and wherein the cooling medium maintains the first reactor system operating temperature within a range of from about 270° C. to less than about 320° C.

8. The process of claim 5, wherein the cooling medium comprises boiling water;
   wherein the boiling water is characterized by a temperature of from about 260° C. to about 295° C.;
   and wherein the cooling medium maintains the first reactor system operating temperature within a range of from about 270° C. to less than about 300° C.

9. The process of claim 1, wherein the first reactor system comprises two or more ODH stages in series; wherein an ODH stage effluent is recovered from each ODH stage; wherein at least one ODH stage is substantially adiabatic;

and wherein the ODH stage effluent is cooled prior to introducing it to a downstream ODH stage.

10. The process of claim 9 further comprising (1) interstage effluent cooling between any two consecutive ODH stages in series; and/or (2) interstage ethane addition and/or interstage oxygen addition to the first reactor system.

11. The process of claim 1, wherein ethylene is not separated from the first effluent stream.

12. The process of claim 1, wherein a recycle split ratio is less than about 0.6; and
wherein the recycle split ratio is defined as the ratio of the volumetric flowrate of the portion of the recycle stream recycled to the first reactor system divided by the sum of the volumetric flowrate of the portion of the recycle stream recycled to the first reactor system and the volumetric flowrate of the portion of the recycle stream recycled to the second reactor.

13. The process of claim 1, wherein (1) the first reactant mixture is characterized by a molar ratio of ethylene to ethane of from about 1.3 to about 3.0; (2) the first effluent stream is characterized by an ethane concentration of from about 0.1 mol % to about 5 mol %; (3) the first reactor system is characterized by an ethane conversion of from about 60% to about 100%; (4) the first reactor system is characterized by an oxygen conversion of from about 30% to about 100%; (5) a concentration of ethane in the second reactant mixture and/or the recycle stream is from about 0.1 mol % to about 3 mol %; (6) the recycle stream is characterized by a combined concentration of ethane and ethylene of from about 15 mol % to about 60 mol %; or (7) any combinations of (1)-(6).

14. The process of claim 1 further comprising withdrawing a portion of the recycle stream as a purge stream; wherein the purge stream is characterized by a purge ratio of from about 0.0001 to about 0.005; and wherein the purge ratio is defined as the ratio of the volumetric flowrate of the purge stream divided by the volumetric flowrate of the recycle stream.

15. An ethylene oxide (EO) production process comprising:
(a) introducing a first reactant mixture to an oxidative dehydrogenation (ODH) reactor system to produce a first effluent stream; wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture;
wherein the ODH reactor system is a multitubular reactor; wherein the multitubular reactor comprises a shell and a plurality of tubes disposed inside the shell; wherein the plurality of tubes are substantially parallel to each other; wherein each tube comprises an ODH catalyst disposed therein; wherein the first reactant mixture is introduced to each of the plurality of tubes;
wherein the multitubular reactor comprises a cooling medium contacting an inside shell surface and an outside surface of the tubes; wherein the cooling medium comprises boiling water; and wherein the boiling water is characterized by a temperature of from about 260° C. to about 310° C.;
(b) introducing a second reactant mixture to an EO reactor to produce a second effluent stream;
wherein the second reactant mixture comprises at least a portion of the first effluent stream;
and wherein the second effluent stream comprises EO, ethane, ethylene, and oxygen;
(c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and
(d) recycling at least a portion of the recycle stream to the ODH reactor system in step (a) without separating ethylene from the recycle stream prior to the recycling, and optionally recycling a portion of the recycle stream to the EO reactor in step (b).

16. The process of claim 15, wherein the cooling medium maintains the ODH reactor system operating temperature within a range of from about 270° C. to less than about 320° C.; and wherein the ODH reactor system operating temperature is defined as the average of ODH reactor system inlet temperature and ODH reactor system outlet temperature.

17. The process of claim 15, wherein the cooling medium comprises boiling water;
and wherein the boiling water is characterized by a temperature of from about 260° C. to about 310° C.

18. The process of claim 15, wherein the ODH reactor system is characterized by an ODH reactor system operating temperature of from about 270° C. to less than about 300° C.; and
wherein the ODH reactor system operating temperature is defined as the average of ODH reactor system inlet temperature and ODH reactor system outlet temperature.

19. An ethylene oxide (EO) production process comprising:
(a) introducing a first reactant mixture to an oxidative dehydrogenation (ODH) reactor system to produce a first effluent stream; wherein the first reactant mixture comprises ethane, ethylene, and oxygen; wherein the first effluent stream comprises ethylene, ethane, and oxygen; wherein the mole fraction of ethylene in the first effluent stream is greater than the mole fraction of ethylene in the first reactant mixture;
wherein the ODH reactor system is characterized by an ODH reactor system operating temperature; wherein the ODH reactor system operating temperature is defined as the average of ODH reactor system inlet temperature and ODH reactor system outlet temperature;
wherein the ODH reactor system comprises two or more ODH stages in series; wherein at least one ODH stage is substantially adiabatic; wherein an ODH stage effluent is recovered from each ODH stage; wherein the ODH stage effluent is cooled prior to introducing it to a downstream ODH stage; and
wherein each ODH stage is characterized by an ODH stage operating temperature; wherein each ODH stage operating temperature is defined as the average of ODH stage inlet temperature and ODH stage outlet temperature for that particular ODH stage;
(b) introducing a second reactant mixture to an EO reactor to produce a second effluent stream;
wherein the second reactant mixture comprises at least a portion of the first effluent stream;
and wherein the second effluent stream comprises EO, ethane, ethylene, and oxygen;
(c) separating at least a portion of the second effluent stream into an EO product stream and a recycle stream; wherein the EO product stream comprises at least a portion of the EO in the second effluent stream; and wherein the recycle stream comprises ethane, ethylene, and oxygen; and (d) recycling at least a portion of the recycle stream to the ODH reactor system in step (a) without separating ethylene from the recycle stream prior to the recycling, and optionally recycling a portion of the recycle stream to the EO reactor in step (b).

20. The process of claim 19, wherein boiling water is used to provide for cooling the ODH stage effluent prior to introducing it to a downstream ODH stage.

* * * * *